(12) United States Patent
Takahashi et al.

(10) Patent No.: US 7,297,056 B2
(45) Date of Patent: Nov. 20, 2007

(54) VIDEO GAME DEVICE AND STORAGE MEDIUM STORING VIDEO GAME PROGRAM

(75) Inventors: Hiroyuki Takahashi, Shinjuku-ku (JP); Shugo Takahashi, Shinjuku-ku (JP); Toshiharu Izuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 802 days.

(21) Appl. No.: 10/827,404

(22) Filed: Apr. 20, 2004

(65) Prior Publication Data

US 2004/0214623 A1   Oct. 28, 2004

(30) Foreign Application Priority Data

Apr. 22, 2003   (JP)   ............... 2003-117047

(51) Int. Cl.
*A63F 9/00*   (2006.01)

(52) U.S. Cl. .................. 463/3; 463/1; 463/30; 463/37

(58) Field of Classification Search ............... 463/2, 463/3, 4, 5, 6, 7, 8, 36, 37
See application file for complete search history.

(56) References Cited

U.S. PATENT DOCUMENTS

| | | | |
|---|---|---|---|
| 6,217,444 B1 * | 4/2001 | Kataoka et al. | 463/3 |
| 6,394,896 B2 * | 5/2002 | Sugimoto | 463/3 |
| 6,626,756 B2 * | 9/2003 | Sugimoto | 463/4 |
| 6,878,058 B1 | 4/2005 | Serizawa et al. | |
| 2001/0011035 A1 * | 8/2001 | Sugimoto | 463/3 |
| 2004/0248630 A1 * | 12/2004 | Hodgson et al. | 463/3 |

FOREIGN PATENT DOCUMENTS

| | | |
|---|---|---|
| JP | 8-305892 | 11/1996 |
| JP | 10-151277 | 6/1998 |
| JP | 2003-71131 | 11/2003 |

OTHER PUBLICATIONS

Feb. 16, 2007 Office Action issued in corresponding Japanese Application 2003-117047.

* cited by examiner

*Primary Examiner*—Robert E. Pezzuto
*Assistant Examiner*—Josh Wert
(74) *Attorney, Agent, or Firm*—Nixon & Vanderhye P.C.

(57) ABSTRACT

A turning point marker on a power gauge and an impact point object are displayed in a game image. The impact point object is displayed according to the current lie. The turning point marker is positioned away from the left end of the power gauge depending on the difficulty of the shot. The moving direction of a cursor moving along the power gauge is reversed at the turning point marker. With the turning point marker, it is possible to clearly indicate to the player how limited the power available is under the current situation as compared with the situation where the maximum power is available, and thus how difficult it is to play the current situation.

34 Claims, 16 Drawing Sheets

F I G. 3
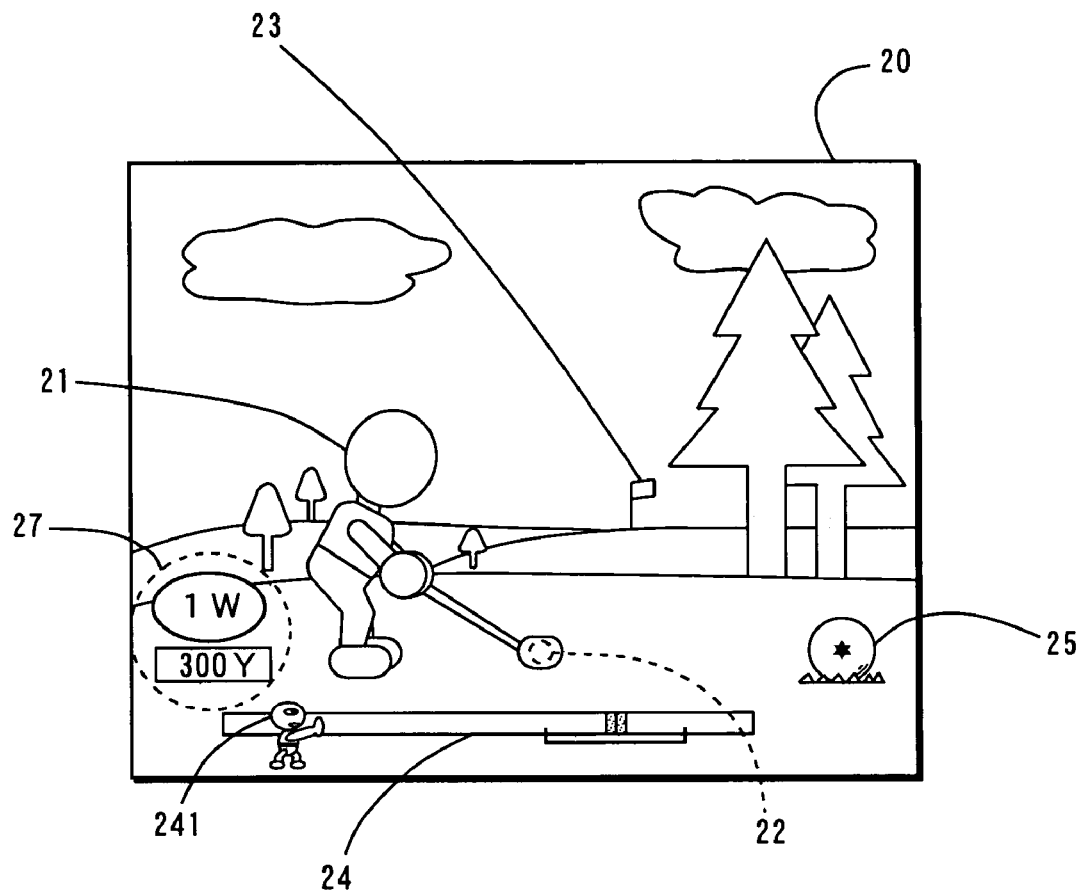

F I G. 6
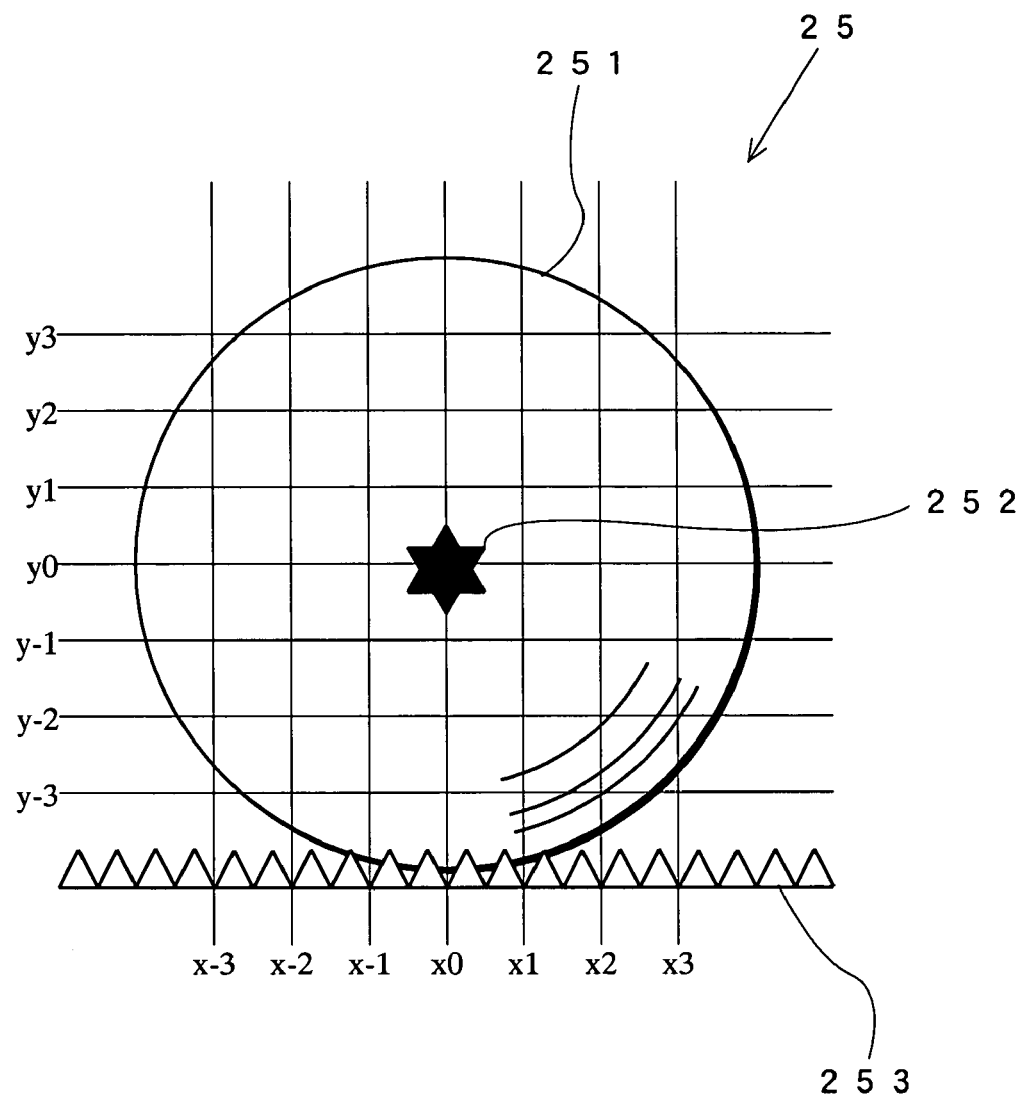

F I G. 1 0
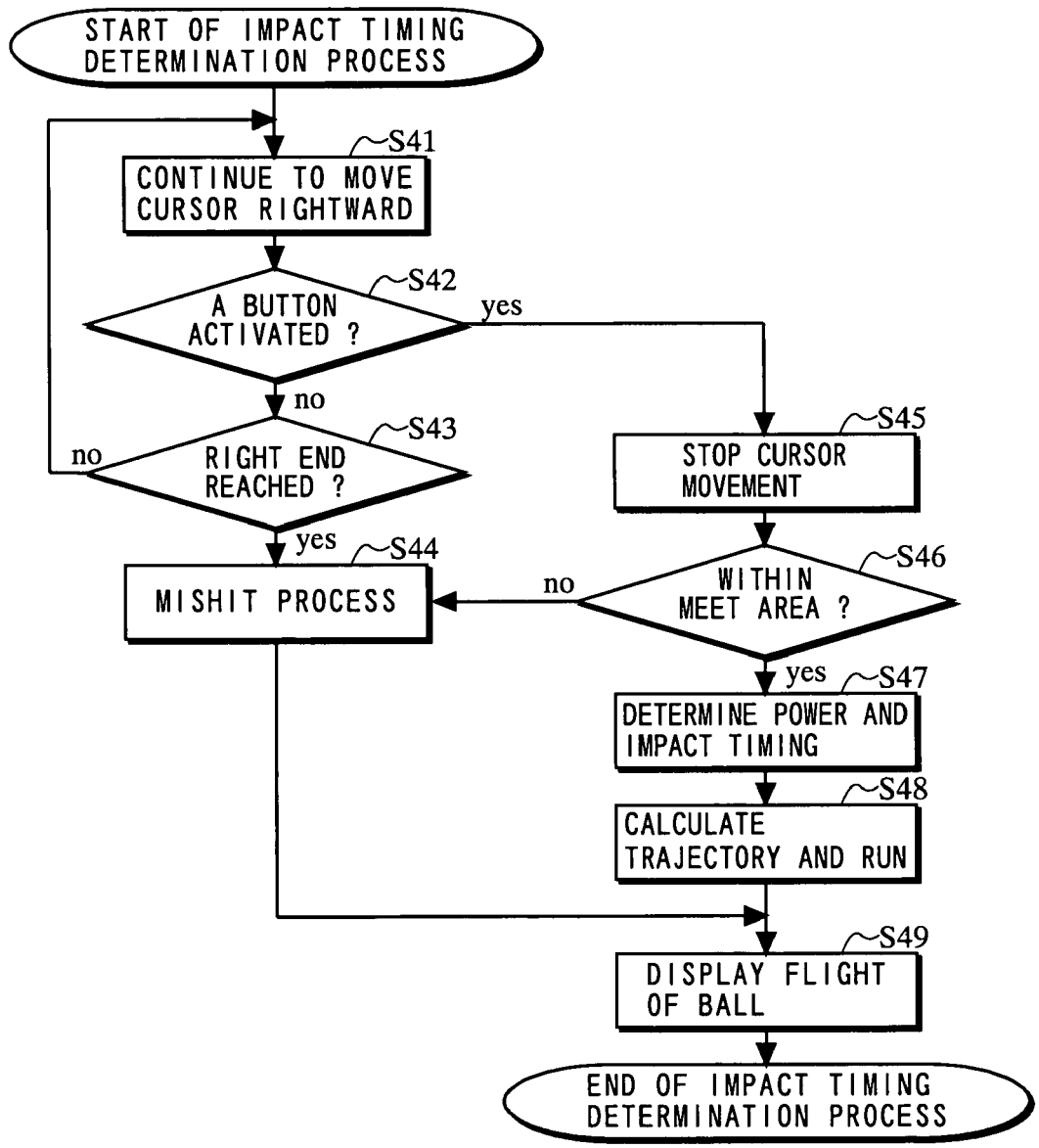

FIG. 11

CHARACTER TABLE

| CHARACTER NAME | TURNING POINT SETTING |
|---|---|
| CHARACTER 1 | SETTING A |
| CHARACTER 2 | SETTING B |
| CHARACTER 3 | SETTING C |
| CHARACTER 4 | SETTING B |
| CHARACTER 5 | SETTING A |
| CHARACTER 6 | SETTING A |
| CHARACTER 7 | SETTING C |
| ⋮ | ⋮ |

F I G. 1 2

TURNING POINT SETTINGS TABLE

| LIE | TURNING POINT SETTING | | |
|---|---|---|---|
| | SETTING A | SETTING B | SETTING C |
| TEE SHOT | 1.00 | 1.00 | 1.00 |
| FAIRWAY | 1.00 | 0.90 | 0.80 |
| LIGHT ROUGH | 0.90 | 0.80 | 0.65 |
| HEAVY ROUGH | 0.80 | 0.65 | 0.80 |
| BUNKER | 0.50 | 0.40 | 1.00 |
| BUNKER (FRIED EGG) | 0.30 | 0.20 | 0.90 |
| ... | ... | ... | ... |

FIG. 13

LIE-CLUB COMPATIBILITY TABLE

| CLUB | LIE | | | | | | |
|---|---|---|---|---|---|---|---|
| | TEE SHOT | FAIRWAY | ROUGH | | BUNKER | | ... |
| | | | LIGHT | HEAVY | NORMAL | FRIED EGG | |
| 1W | 1.00 | 0.60 | 0.40 | 0.20 | 0.10 | 0.05 | ... |
| 3W | 1.00 | 0.90 | 0.45 | 0.25 | 0.11 | 0.06 | ... |
| 5W | 1.00 | 0.90 | 0.50 | 0.30 | 0.12 | 0.07 | ... |
| 1I | 1.00 | 0.95 | 0.95 | 0.70 | 0.30 | 0.20 | ... |
| 2I | 1.00 | 0.95 | 0.95 | 0.75 | 0.35 | 0.25 | ... |
| 3I | 1.00 | 0.95 | 0.95 | 0.80 | 0.50 | 0.40 | ... |
| ... | ... | ... | ... | ... | ... | ... | ... |
| SW | 1.00 | 0.95 | 0.95 | 0.90 | 0.70 | 0.60 | ... |
| PT | — | 0.95 | 0.95 | 0.90 | 0.70 | 0.60 | ... |

F I G. 1 4

ENVIRONMENTAL FACTOR TABLE

| ENVIRONMENTAL FACTOR | | MARKER POSITION DATA |
|---|---|---|
| DAYTIME | FAIR | 1.00 |
| | RAIN | 0.80 |
| | SNOW | 0.70 |
| DUSK | FAIR | 0.90 |
| | RAIN | 0.70 |
| | SNOW | 0.60 |
| NIGHT | FAIR | 0.80 |
| ⋮ | ⋮ | ⋮ |

FIG. 16

CURSOR SPEED TABLE

| LIE | SPEED |
|---|---|
| TEE SHOT | 1 |
| FAIRWAY | 1 |
| LIGHT ROUGH | 2 |
| HEAVY ROUGH | 3 |
| BUNKER | 5 |
| BUNKER (FRIED EGG) | 7 |
| ⋮ | ⋮ |

VIDEO GAME DEVICE AND STORAGE MEDIUM STORING VIDEO GAME PROGRAM

FIELD

The technology herein relates to a video game device and a storage medium storing a video game program, and, more particularly, to a video game device and a storage medium storing a video game program for playing a golf game that proceeds as the player hits a ball.

BACKGROUND AND SUMMARY

Various video game devices and video game programs have been developed in the art for playing a golf game on a screen by using a computer provided in a video game device, or the like. Typically, in a golf game, the player operates a controller to select a club to be used for hitting the ball, the power, the direction and the impact point position of the shot, and the impact timing, etc. Then, a shot is reproduced on the screen according to these operations. Shot parameters of the golf game include pre-shot parameters and in-shot parameters. The pre-shot parameters are parameters that are set by the player before the shot action, and include the club to be used for hitting the ball, and the direction and the impact point position of the shot. The in-shot parameters are parameters that are determined by the timing of the operation by the player during the shot action, and include the power and the impact timing of the shot. Thereafter in the shot action, the ball's trajectory is calculated, and the final position to be reached by the ball is determined, based on the pre-shot parameters and the in-shot parameters.

A golf game disclosed in Japanese Laid-Open Patent Publication No. 10-151277 uses a power gauge for setting the power of a shot. The power gauge may be, for example, a power gauge of one type where the inside of the gauge is filled gradually, or a power gauge of another type where a cursor moves along the gauge. These types of power gauges are not substantially different from each other, and they both indicate to the player the increase/decrease of the shot power. The player can set the shot power by performing a predetermined operation at a time when a desirable portion of the power gauge is filled or when the cursor is at a desirable position along the power gauge. In the golf game disclosed in Japanese Laid-Open Patent Publication No. 10-151277, the length of the power gauge itself is varied according to the stance width when making a shot. Specifically, the greater the stance width set by the player is, the longer the power gauge will be. The variation of the length of the power gauge itself allows the player to make a shot with great power or with a limited range of power depending on the situation.

However, in the golf game where the length of the power gauge itself is varied, the player may not be able to know the length of the current power gauge with respect to the largest possible length of the power gauge (i.e., such a length of the power gauge that allows the player to make a shot with the maximum power possible). For example, when the gauge length is 90, with 100 being the largest possible length of the power gauge, the player may not notice the shortening of the gauge length. Even if the player notices the shortening of the gauge length, it is difficult for the player to know whether the gauge length is 90, 85 or 95. Therefore, it is difficult for the player to know, with the power gauge being displayed, when to perform the predetermined power-setting operation in order to set an appropriate power. Moreover, a beginning player may be confused by the change in the display of the power gauge itself in the golf game disclosed in Japanese Laid-Open Patent Publication No. 10-151277.

Therefore, a feature of the exemplary illustrative embodiments herein provides a video game device and a storage medium storing a video game program in which the limitation on the power available for a shot is varied depending on the situation, wherein it is possible to clearly indicate how limited the power available is under the current situation as compared with the situation where the maximum power is available, and thus how difficult it is to play in the current situation. Another feature of the exemplary illustrative embodiments herein provides a video game device and a storage medium storing a video game program, in which changing the limitation on the power depending on the situation can be realized simply without changing the display of the power gauge itself.

The exemplary illustrative embodiments herein have the following features to attain the objects mentioned above.

A first aspect of an exemplary illustrative embodiment is directed to a video game device for playing a golf game that proceeds in response to a player's operation. The video game device includes input means (e.g., the controller 6 in the illustrated exemplary embodiment), gauge display control means (e.g., the CPU 31 performing steps S14 and S21 in the illustrated exemplary embodiment; only the step numbers will be indicated hereinafter), cursor display control means (S32, S35, S39 and S41), first determination means (S38 and S40), shot condition setting means (S11, S12 and S19), and marker display control means (S13 and S20). The input means is operated by the player. The gauge display control means displays, with a constant length, a gauge (the power gauge 24) used for determining the power for hitting the ball. The cursor display control means displays a cursor (the cursor 244) moving along the gauge. The first determination means determines the power based on the position of the cursor (open arrow At2) with respect to the gauge at the time of a predetermined operation of the input means (the activation of the A button 62). The shot condition setting means sets a shot condition (the lie, the club, an environment factor) influencing the ball travel distance determined according to the power. The marker display control means displays a marker (the turning point marker 241) indicating one end of the moving range of the cursor along the gauge at a position according to the shot condition set by the shot condition setting means.

According to this aspect of an exemplary illustrative embodiment, the position of the marker, which is displayed on or near the gauge, is changed, thereby changing the moving range of the cursor along the gauge, according to the situation in the golf game (the shot condition) while the gauge length stays constant. As the change in the position of the marker is displayed in the game image, the player can visually check the position of the marker with respect to the gauge, which is displayed with a constant length for various situations in the golf game, and the player can readily determine how difficult it is to play the current situation. Specifically, the power is determined based on the position of the cursor moving along the gauge. Since the cursor does not move across the marker, the portion of the gauge beyond the marker is not used for determining the power. Therefore, as the position of the marker changes, the player can readily see where the marker is being currently positioned with respect to the gauge. Therefore, the player can readily determine how limited the power available is under the current situation as compared with the situation where the maximum power is available, and thus how difficult it is to play the current situation. Moreover, the player can readily estimate the influence of the power limitation on the shot distance, and thus to estimate the shot distance available under the current situation. Moreover, changing the limitation on the power depending on the situation can simply be realized without changing the display of the gauge itself.

In one example, when the cursor displayed by the cursor display control means reaches the marker, the moving direction of the cursor is reversed (S35) so that the cursor thereafter moves in the opposite direction along the gauge. Therefore, by changing the position of the marker, it is possible to significantly change the rhythm and the difficulty of the power determination operation, thereby enhancing the playability of the game. The cursor display control means may continue to move the cursor in the same direction along the gauge even after the power is determined by the first determination means. In this case, the video game device further includes second determination means (S47). The second determination means further determines, after the power is determined by the first determination means, another shot parameter (impact timing) based on the position of the cursor (open arrow At3) with respect to the gauge at the time of a predetermined operation of the input means (the activation of the A button 62). Thus, as the marker is displayed at a position such that the moving range of the cursor is narrowed, the amount of time allowed for the power determination operation and the operation of determining the other shot parameter is shortened, and the difficulty of these operations is increased, thereby further enhancing the playability of the game. Specifically, where the power is determined while the cursor is moving in one direction, and the other shot parameter is determined while the cursor is moving in the other direction after reversing its moving direction at the marker position, as the marker is displayed at a position such that the moving range of the cursor is narrowed, the amount of time from the power determination operation to the operation of determining the other shot parameter is shortened. Moreover, where the power and the other shot parameter are determined while the cursor is moving in the second direction after reversing its moving direction at the marker position, as the marker is displayed at a position such that the moving range of the cursor is narrowed, the amount of time from the reversal of the moving direction of the cursor to the power determination operation is also shortened.

In another example, when the cursor displayed by the cursor display control means reaches the marker, the cursor jumps back to the other end of the moving range and repeats moving in the same direction along the gauge. Thus, after the cursor reaches the marker position along the gauge, the cursor appears at the other end of the gauge and repeats moving in the same direction. Therefore, by changing the position of the marker, it is possible to significantly change the rhythm and the difficulty of the power determination operation, thereby enhancing the playability of the game.

The video game device may further include difficulty table storing means (the work memory 32). The difficulty table storing means pre-stores, as a difficulty table (the lie-club compatibility table, the environmental factor table, the cursor speed table), a data table defining a numerical difficulty level (marker position data) associated with each shot condition that can be set in the golf game so that each difficulty level reflects that in real golf under the associated shot condition. In this case, the marker display control means retrieves, from the difficulty table, a value associated with the shot condition set by the shot condition setting means, and determines the position of the marker based on the retrieved value. Thus, the position of the marker is determined based on a numerical difficulty level for the current shot condition, which reflects the difficulty of the shot in real golf, whereby the player can enjoy various shots with realistic difficulty levels in determining the cursor position.

With respect to the use of the difficulty table storing means, various examples are possible as follows. In a first example, the marker display control means displays the marker at a position closer to the starting position of the cursor (the best timing point 243) for a difficulty level indicated by the retrieved value as higher. Thus, the position of the marker is determined based on a numerical difficulty level for the current shot condition, which reflects the difficulty of the shot in real golf, so that the marker is displayed at a position closer to the starting position of the cursor for a higher difficulty level. As the marker is displayed at a position closer to the starting position of the cursor, the operation of determining the cursor position becomes more difficult. Thus, the difficulty of the controller operation for a certain situation can be linked with the difficulty of the situation in real golf, and the situation can be indicated to the player.

In a second example, the difficulty table (the lie-club compatibility table) defines a value for each lie indicating the condition of the ground on which the ball is lying. Then, the shot condition setting means sets at least the lie before a shot as the shot condition. In this case, the marker display control means retrieves, from the difficulty table, a value associated with the lie before a shot, and determines the position of the marker based on the retrieved value. Thus, the position of the marker can be determined based on the condition of the lie before the shot operation. Since each value defined in the difficulty table represents the difficulty level for a lie, the difficulty of a shot under the lie condition can be indicated to the player by way of the marker position. For example, the marker can be displayed at a position closer to the starting position of the cursor for a poorer lie condition, so that the difficulty of the operation of determining the cursor position is increased higher for poorer lie conditions. As the marker position is changed, the increase in the difficulty is indicated to the player, which can be a reference for the player when setting a shot condition such as the power. The difficulty table (the lie-club difficulty table) may further define a value for each combination of the lie and the club that can be selected in the golf game. In this case, the shot condition setting means sets at least the combination of the lie before a shot and the club selected for the shot as the shot condition. Then, the marker display control means retrieves, from the difficulty table, a value associated with the combination of the lie before the shot and the selected club, and determines the position of the marker based on the retrieved value. Since each value defined in the difficulty table represents the difficulty level for a combination of a lie and a club, the position of the marker can be determined based on how appropriate the club selection is for the lie before the shot operation. Thus, the difficulty of a shot with the selected club for the current lie condition can be indicated to the player by way of the marker position. For example, the marker can be displayed at a position closer to the starting position of the cursor for a less appropriate club selection for the lie condition, so that the difficulty of the operation of determining the cursor position can be increased for an inappropriate club selection for the lie.

In a third example, the difficulty table (the environmental factor table) defines a value for each environmental factor of a hole played. Then, the shot condition setting means sets at least an environmental factor of a hole currently being played as the shot condition. In this case, the marker display control means retrieves, from the difficulty table, a value associated with the environmental factor of the hole being played, and determines the position of the marker based on the retrieved value. Since each value defined in the difficulty table represents the difficulty level for the environment of a hole, the difficulty of a shot for an environmental factor of the hole being played can be indicated to the player by way of the marker position. For example, the marker can be displayed at a position closer to the starting position of the cursor for an undesirable environmental factor (rain, night, etc.), so that the difficulty of the operation of determining the cursor position can be increased for an undesirable environmental factor.

In a fourth example, the video game device further includes cursor speed calculation means (S31). The cursor speed calculation means calculates the speed of the cursor moving along the gauge. The cursor speed calculation means retrieves, from the difficulty table (cursor speed table), a value associated with a shot condition set by the shot condition setting means, and calculates the speed based on the retrieved value. In this case, the cursor display control means moves the cursor along the gauge based on the speed calculated by the cursor speed calculation means. Thus, the speed of the cursor moving along the gauge is changed in addition to changing the position of the marker, thereby changing the rhythm of the operation of determining the position of the cursor moving along the gauge, thus further enhancing the playability of the game. Since the speed of the cursor is changed based on a value representing the difficulty of the shot in real golf, the player can enjoy various shots with realistic difficulty levels in determining the cursor position.

The video game device may further include character table storing means (the work memory 32). The character table storing means pre-stores, as a character table (the character table, the turning point settings table), a data table defining a numerical shot characteristic associated with each combination of a character that can be used in the golf game and a shot condition that can be set in the golf game. In this case, the marker display control means retrieves, from the character table, a value associated with the combination of the character making the shot and the shot condition set by the shot condition setting means, and determines the position of the marker based on the retrieved value. With the character table defining characteristic of each character in terms of the shot characteristic, the position of the marker can be changed according to the characteristic of the character being used. Thus, the player can enjoy a variety of rhythms of the controller operation for different characters, and the game is provided with a wide diversity. Since the characteristic of the character is indicated to the player by way of the marker position, the player can enjoy the characteristic of each character by the position of the marker. For example, the character table defines a value for each combination of a lie indicating the condition of the ground on which the ball is lying and the character. In this case, the marker display control means retrieves, from the character table, a value associated with a combination of the lie before the shot and the character making the shot, and determines the position of the marker based on the retrieved value. Thus, a lie at which a given character is good can be defined in the character table, and the position of the marker can be determined on this basis. Thus, the player can know if the character is good or poor at the lie by way of the marker position, and the game is provided with wide diversity.

At least if the condition of the ground on which the ball is lying at the time the shot is to be taken is a rough or a bunker, the shot condition setting means may set, as the shot condition, the ground condition being a rough or a bunker. Then, the marker display control means may display the marker at a position closer to the starting position of the cursor if the ground condition is a rough or a bunker. Thus, the marker can be displayed at a position closer to the starting position of the cursor for a lie that is generally more difficult to hit from in real golf, such as a rough or a bunker, whereby the difficulty of the operation of determining the cursor position can be increased for a shot from a rough or a bunker.

A second aspect of an exemplary illustrative embodiment is directed to a video game device for playing a golf game that proceeds in response to a player's operation. The video game device includes input means, gauge display control means, cursor display control means, determination means (S38 and S40), putt condition setting means (S11 and S12) and marker display control means. The input means is operated by the player. The gauge display control means displays, with a constant length, a gauge used for determining the power for hitting the ball. The cursor display control means displays a cursor moving along the gauge. The determination means determines the power based on the position of the cursor with respect to the gauge at the time of a predetermined operation of the input means. The putt condition setting means sets a putt condition (the lie, an environment factor) influencing the ball travel distance determined according to the power. The marker display control means displays a marker indicating one end of the moving range of the cursor along the gauge at a position according to the putt condition set by the putt condition setting means.

According to this aspect of an exemplary illustrative embodiment, when making a putt on the green, the position of the marker, which is displayed on or near the gauge, is changed, thereby changing the moving range of the cursor along the gauge according to the putt condition, while the gauge length stays constant. As the change in the position of the marker is displayed in the game image, the player can visually check the position of the marker with respect to the gauge, and the player can readily determine the current condition for the putt. Specifically, the power is determined based on the position of the cursor moving along the gauge. The portion of the gauge beyond the marker is not used for determining the power. Therefore, as the position of the marker changes, the player can readily see where the marker is being currently positioned with respect to the gauge. Therefore, the player can readily determine how limited the power available is under the current situation as compared with the situation where the maximum power is available, and thus how difficult it is to play the current situation. Moreover, the player can readily estimate the influence of the power limitation on the ball travel distance for the putt, and thus estimate the ball travel distance available under the current situation. Moreover, changing the limitation on the power depending on the situation can be realized simply without changing the display of the gauge itself. Moreover, it is possible to change the rhythm and the difficulty of the operation of determining the position of the cursor moving along the gauge, thereby enhancing the playability of the game.

For example, at least if the condition of the ground on which the ball is lying at the time the shot is to be taken is a green, the putt condition setting means sets, as the putt condition, the speed at which the ball rolls on the green. Then, the marker display control means displays the marker at a position closer to the starting position of the cursor if the speed of the ball is higher than a predetermined value. Thus, by displaying the marker at a position closer to the starting position of the cursor for a fast green on which it is more difficult to putt in real golf, it is possible to increase the difficulty of the operation of determining the cursor position for a putt on a fast green.

A third aspect of an exemplary illustrative embodiment is directed to a video game device for playing a golf game that proceeds in response to a player's operation. The video game device includes input means, gauge display control means, filling means, determination means (S38 and S40), shot condition setting means and turning point marker display control means (S13 and S20). The input means is operated by the player. The gauge display control means displays, with a constant length, a gauge used for determining the power for hitting the ball. The filling means gradually fills the inside of the gauge in a predetermined direction. The determination means determines the power based on the position of the front end of the filled area filled by the filling means with respect to the gauge at the time of a predetermined operation of the input means. The shot condition setting means sets a shot condition influencing the ball travel distance determined according to the power. The turning point marker display control means displays a turning point marker (the turning point marker 241) at a position according to the shot condition set by the shot condition setting means, the turning point marker indicating the position at which the direction of the filling operation by the filling means is reversed. The filling means reverses the direction of the filling operation when the front end of the filled area reaches the turning point marker.

According to this aspect of an exemplary illustrative embodiment, where the gauge is gradually filled and the power is determined based on the position of the front end of the filled area, the turning point marker indicating the position at which the filling direction is reversed is displayed in the game image, whereby the player can visually check the position of the turning point marker with respect to the gauge, and the player can readily determine how difficult it is to play the current situation. Specifically, the power is determined based on the position of the front end of the filled area along the gauge, and the portion of the gauge beyond the turning point marker is not used for determining the power. Therefore, as the position of the turning point marker changes, the player can readily see where the turning point marker is being currently positioned with respect to the gauge. Therefore, the player can readily determine how limited the power available is under the current situation as compared with the situation where the maximum power is available, and thus how difficult it is to play the current situation. Moreover, the player can readily estimate the influence of the power limitation on the shot distance, and thus to estimate the shot distance available under the current situation. Moreover, changing the limitation on the power depending on the situation can simply be realized without changing the display of the gauge itself. The filling direction is reversed when the front end of the filled area reaches the turning point marker along the gauge, and the gauge is thereafter filled in the opposite direction. Therefore, by changing the position of the turning point marker, it is possible to significantly change the rhythm and the difficulty of the operation of determining the power based on the position of the front end of the filled area, thereby enhancing the playability of the game.

A fourth aspect of an exemplary illustrative embodiment is directed to a video game device for playing a game in which an object is moved in response to a player's operation. The video game device includes input means, gauge display control means, cursor display control means, determination means, object moving condition setting means (S11, S12 and S19), and marker display control means. The input means is operated by the player. The gauge display control means displays, with a constant length, a gauge used for determining the power for moving the object. The cursor display control means displays a cursor moving along the gauge. The determination means determines the power based on the position of the cursor with respect to the gauge at the time of a predetermined operation of the input means. The object moving condition setting means sets an object moving condition (the lie, the club, an environment factor) influencing the object travel distance determined according to the power. The marker display control means displays a marker indicating one end of the moving range of the cursor along the gauge at a position according to the object moving condition set by the object moving condition setting means.

According to this aspect of an exemplary illustrative embodiment, effects similar to those of the first aspect of an exemplary illustrative embodiment can be obtained with a game in which an object is moved in response to a player's operation (e.g., a fishing game, a soccer game, an object throwing game such as a hammer throw game, etc.) by displaying the marker at a position according to the object moving condition.

A fifth aspect of an exemplary illustrative embodiment is directed to a storage medium storing a video game program to be executed by a computer for playing a golf game that proceeds in response to a player's operation. The video game program stored in the storage medium instructs the computer to perform a gauge display control step (S14 and S21), a cursor display control step (S32, S35, S39 and S41), a first determination step (S38 and S40), a shot condition setting step (S11, S12 and S19), and a marker display control step (S13 and S20). The gauge display control step displays, with a constant length, a gauge used for determining the power for hitting a ball. The cursor display control step displays a cursor moving along the gauge. The first determination step determines the power based on the position of the cursor with respect to the gauge at the time of a predetermined operation of an input section (the controller 6) by the player. The shot condition setting step sets a shot condition influencing the ball travel distance determined according to the power. The marker display control step displays a marker indicating one end of the moving range of the cursor along the gauge at a position according to the shot condition set in the shot condition setting step.

According to this aspect of an exemplary illustrative embodiment, effects similar to those of the first aspect of an exemplary illustrative embodiment can be obtained with a storage medium storing a video game program to be executed by a computer.

In one example, when the cursor displayed in the cursor display control step reaches the marker, the moving direction of the cursor is reversed so that the cursor thereafter moves in an opposite direction along the gauge. The cursor display control step may continue to move the cursor in the same direction along the gauge even after the power is determined in the first determination step. In this case, the video game program stored in the storage medium instructs the computer to further perform a second determination step (S47). The second determination step further determines, after the power is determined in the first determination step, another shot parameter based on the position of the cursor with respect to the gauge at the time of a predetermined operation of the input section.

In another example, when the cursor displayed in the cursor display control step reaches the marker, the cursor jumps back to the other end of the moving range and repeats moving in the same direction along the gauge.

The video game program may instruct the computer to further perform a difficulty table storing step (the work memory 32). The difficulty table storing step pre-stores, as a difficulty table, a data table defining a numerical difficulty level associated with each shot condition that can be set in the golf game so that each difficulty level reflects that in real golf under the associated shot condition. Then, the marker display control step retrieves, from the difficulty table, a value associated with the shot condition set in the shot condition setting step, and determines the position of the marker based on the retrieved value.

With respect to the use of the difficulty table storing step, various examples are possible as follows. In a first example, the marker display control step displays the marker at a position closer to the starting position of the cursor for a difficulty level indicated by the retrieved value as higher.

In a second example, the difficulty table defines a value for each lie indicating the condition of the ground on which the ball is lying. Then, the shot condition setting step sets at least the lie before a shot as the shot condition. In this case, the marker display control step retrieves, from the difficulty table, a value associated with the lie before a shot, and determines the position of the marker based on the retrieved value. The difficulty table may further define a value for each combination of the lie and the club that can be selected in the golf game. In this case, the shot condition setting step sets at least the combination of the lie before a shot and the club selected for the shot as the shot condition. Then, the marker display control step retrieves, from the difficulty table, a value associated with the combination of the lie before the shot and the selected club, and determines the position of the marker based on the retrieved value.

In a third example, the difficulty table defines a value for each environmental factor of a hole played. Then, the shot condition setting step sets at least an environmental factor of a hole currently being played as the shot condition. In this case, the marker display control means retrieves, from the difficulty table, a value associated with the environmental factor of the hole being played, and determines the position of the marker based on the retrieved value.

In a fourth example, the video game program stored in the storage medium instructs the computer to further perform a cursor speed calculation step (S31). The cursor speed calculation step calculates the speed of the cursor moving along the gauge. The cursor speed calculation step retrieves, from the difficulty table, a value associated with a shot condition set in the shot condition setting step, and calculates the speed based on the retrieved value. In this case, the cursor display control step moves the cursor along the gauge based on the speed calculated in the cursor speed calculation step.

The video game program stored in the storage medium may instruct the computer to further perform a character table storing step (the work memory 32). The character table storing step pre-stores, as a character table, a data table defining a numerical shot characteristic associated with each combination of a character that can be used in the golf game and a shot condition that can be set in the golf game. In this case, the marker display control step retrieves, from the character table, a value associated with the combination of the character making the shot and the shot condition set in the shot condition setting step, and determines the position of the marker based on the retrieved value. For example, the character table defines a value for each combination of a lie indicating the condition of the ground on which the ball is lying and the character. Then, the shot condition setting step sets at least the combination of the lie before a shot and the character making the shot as the shot condition. In this case, the marker display control step retrieves, from the character table, a value associated with a combination of the lie before the shot and the character making the shot, and determines the position of the marker based on the retrieved value.

At least if the condition of the ground on which the ball is lying at the time the shot is to be taken is a rough or a bunker, the shot condition setting step may set, as the shot condition, the ground condition being a rough or a bunker. Then, the marker display control step may display the marker at a position closer to the starting position of the cursor if the ground condition is a rough or a bunker.

A sixth aspect of an exemplary illustrative embodiment is directed to a storage medium storing a video game program to be executed by a computer for playing a golf game that proceeds in response to a player's operation. The video game program stored in the storage medium instructs the computer to perform a gauge display control step, a cursor display control step, a determination step (S38 and S40), a putt condition setting step (S11, S12 and S19) and a marker display control step. The gauge display control step displays, with a constant length, a gauge used for determining the power for hitting a ball. The cursor display control step displays a cursor moving along the gauge. The determination step determines the power based on the position of the cursor with respect to the gauge at the time of a predetermined operation of an input section by the player. The putt condition setting step sets a putt condition influencing the ball travel distance determined according to the power. The marker display control step displays a marker indicating one end of the moving range of the cursor along the gauge at a position according to the putt condition set in the putt condition setting step.

According to this aspect of an exemplary illustrative embodiment, effects similar to those of the second aspect of an exemplary illustrative embodiment can be obtained with a storage medium storing a video game program to be executed by a computer.

For example, at least if the condition of the ground on which the ball is lying at the time the putt is to be taken is a green, the putt condition setting step sets, as the shot condition, the speed at which the ball rolls on the green. Then, the marker display control step displays the marker at a position closer to the starting position of the cursor if the speed of the ball is higher than a predetermined value.

A seventh aspect of an exemplary illustrative embodiment is directed to a storage medium storing a video game program to be executed by a computer for playing a golf game that proceeds in response to a player's operation. The video game program stored in the storage medium instructs the computer to perform a gauge display control step, a filling step, a determination step, a shot condition setting step and a turning point marker display control step (S13 and S20). The gauge display control step displays, with a constant length, a gauge used for determining the power for hitting the ball. The filling step gradually fills the inside of the gauge in a predetermined direction. The determination step determines the power based on the position of the front end of the filled area filled in the filling step with respect to the gauge at the time of a predetermined operation of an input section by the player. The shot condition setting step sets a shot condition influencing the ball travel distance determined according to the power. The turning point marker display control step displays a turning point marker at a position according to the shot condition set in the shot condition setting step, the turning point marker indicating the position at which the direction of the filling operation in the filling step is reversed. The filling step reverses the direction of the filling operation when the front end of the filled area reaches the turning point marker.

According to this aspect of an exemplary illustrative embodiment, effects similar to those of the third aspect of an exemplary illustrative embodiment can be obtained with a storage medium storing a video game program to be executed by a computer.

An eighth aspect of an exemplary illustrative embodiment is directed to a storage medium storing a video game program to be executed by a computer for playing a game in which an object is moved in response to a player's operation. The video game program stored in the storage medium instructs the computer to perform a gauge display control step, a cursor display control step, a determination step, an object moving condition setting step (S11, S12 and S19) and a marker display control step. The gauge display control step displays, with a constant length, a gauge used for determining the power for moving the object. The cursor display control step displays a cursor moving along the gauge. The determination step determines the power based on the position of the cursor with respect to the gauge at the time of a predetermined operation of an input section by the player. The object moving condition setting step sets an object moving condition influencing the object travel distance determined according to the power. The marker display control step displays a marker indicating one end of the moving range of the cursor along the gauge at a position according to the object moving condition set in the object moving condition setting step.

According to this aspect of an exemplary illustrative embodiment, effects similar to those of the fourth aspect of an exemplary illustrative embodiment can be obtained with a storage medium storing a video game program to be executed by a computer.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 3 shows an exemplary game image 20 of the golf game to be displayed on a TV 2 according to a golf game program executed by the video game device 3 of FIG. 1;

FIG. 6 is a schematic diagram illustrating the impact point position and the lie, as indicated by an impact point object 25 of FIG. 3;

FIG. 10 is a flowchart illustrating the subroutine of step S3 of FIG. 7 in detail;

FIG. 11 shows an exemplary character table used in step S1 of FIG. 7;

FIG. 12 shows an exemplary turning point settings table used in step S1 of FIG. 7;

FIG. 13 shows an exemplary lie-club compatibility table used in step S1 of FIG. 7;

FIG. 14 is an exemplary environmental factor table used in step S1 of FIG. 7;

DETAILED DESCRIPTION

Figure 1:
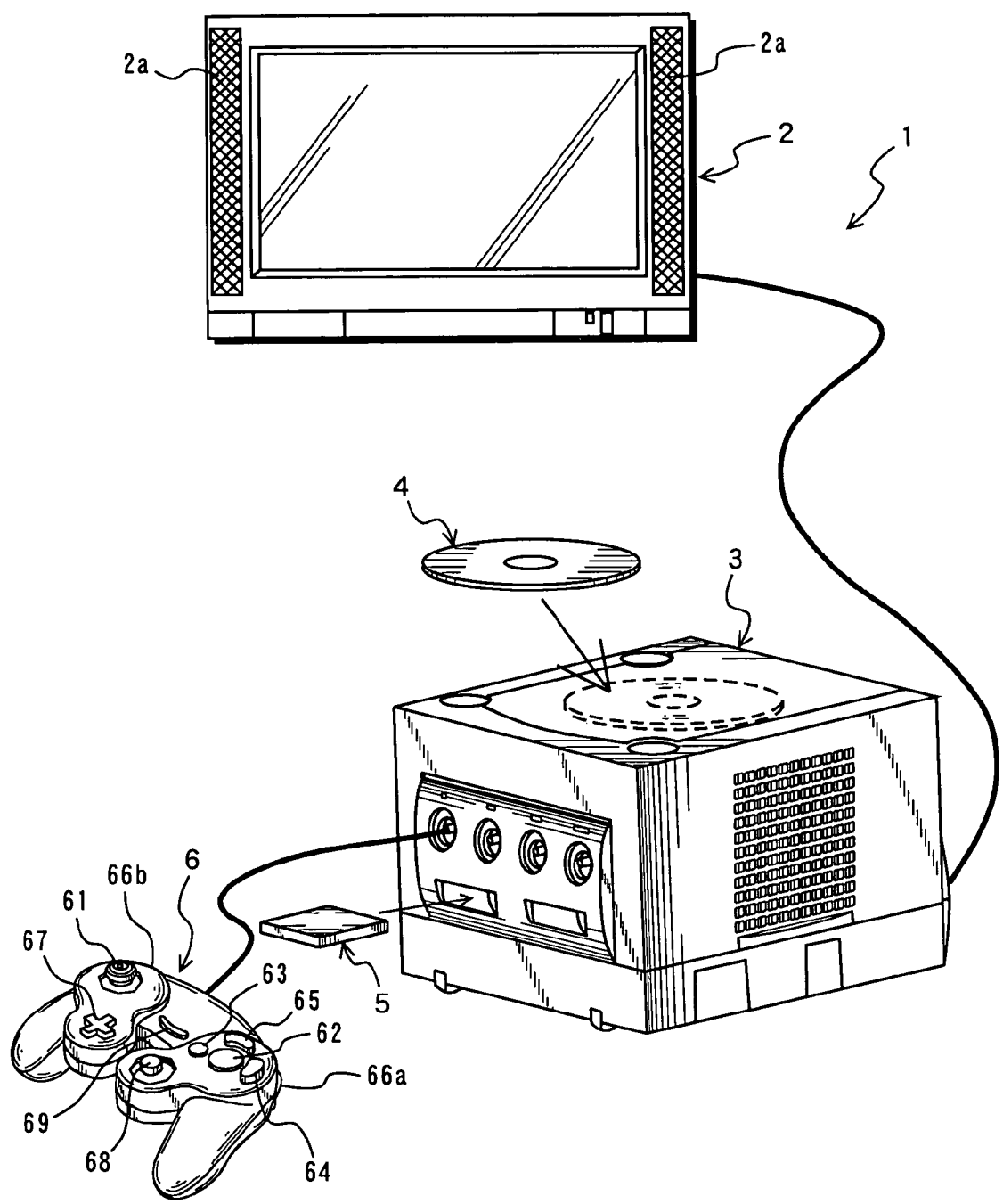
FIG. 1 is a view generally illustrating a video game system according to an exemplary illustrative embodiment.

A video game system 1 according to one exemplary illustrative embodiment will now be described with reference to FIG. 1. FIG. 1 is a view generally illustrating the video game system 1. The exemplary illustrative embodiment will be described below using a home-console type video game device as an example.

Referring to FIG. 1, the video game system 1 includes a home-console type video game device (hereinafter referred to simply as a "video game device") 3, which is connected via a connection cable to a CRT (Cathode Ray Tube) display (hereinafter referred to as a "TV") 2 with loudspeakers 2a, such as a household television set. The video game device 3 includes a controller 6 connected to the video game device 3 via a connection cable, and an optical disk 4 as an exemplary storage medium. A selected optical disk 4 is mounted/dismounted onto/from the video game device 3. As necessary, the video game device 3 can accommodate a memory card 5. The memory card 5 includes a backup memory for static storage of saved data, etc. The video game device 3 executes a video game program stored in the optical disk 4 to obtain and display a game image on the TV 2. The video game device 3 can also display a game image on the TV 2 by recovering the status of a previously-played game based on saved data stored in the memory card 5. The player of the video game device 3 operates the controller 6 while watching the game image displayed on the TV 2 to enjoy the play of the game. While a video game program, etc., are recorded on the optical disk 4 in the present exemplary illustrative embodiment, they may alternatively be provided from a different medium or via a communications line.

As described above, the controller 6 is connected to the video game device 3 via a connection cable, and the connection cable is detachable from the video game device 3. The controller 6 is an operation means for operating, primarily, a player object appearing in the game space displayed on the TV 2 (typically, the main character of the game to be operated by the player). The controller 6 has input sections, including a plurality of operation buttons, a control pad, a control stick, etc. Specifically, the controller 6 includes grips to be gripped by the player. The controller 6 also includes a main control stick 61 and a cross-shaped control pad 67, both of which can be operated by the player's left thumb, for example, a C stick 68, an A button 62, a B button 63, an X button 64, a Y button 65 and a start/pause button 69, all of which can be operated by the player's right thumb, for example. The controller 6 also includes an R button 66a and an L button 66b, which can be operated respectively by the player's right and left index fingers, for example.

For example, where the controller 6 is used to play a golf game to be described below, the main control stick 61 is operated left or right to change the direction of the shot, and up or down to change the club to be used. The cross-shaped control pad 67 is operated up, down, left or right to change the ball impact point position for the shot. The A button 62 is used to determine the shot action of the player object in the game space. For example, the A button 62 is used to start the shot action, determine the shot power, determine the impact timing, etc. Other input sections, which may also be used during the play of the game, will not be described herein in detail as they are not directly relevant to the description of this exemplary illustrative embodiment.

Figure 2:
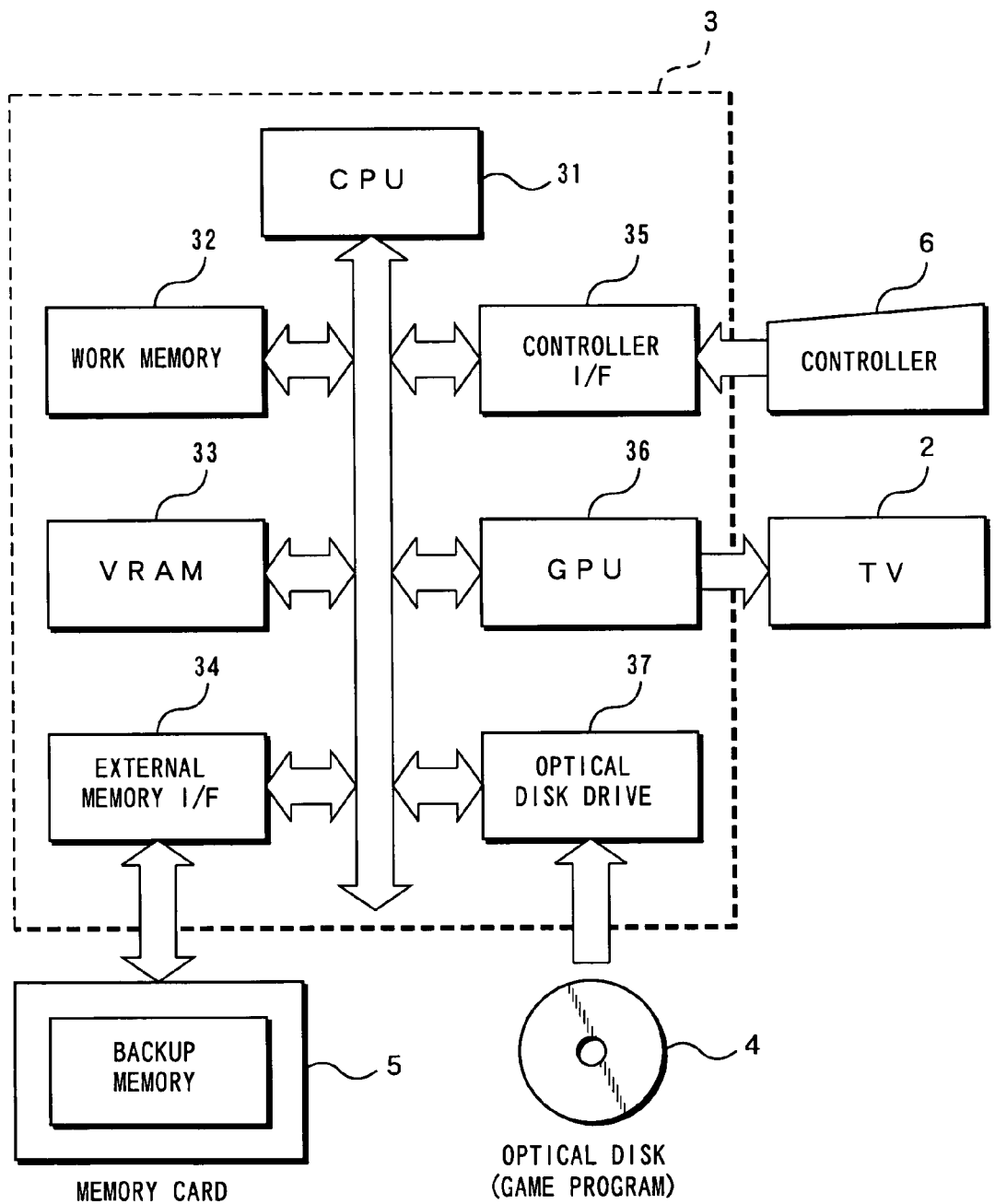
FIG. 2 is a functional block diagram of a video game device 3 of FIG. 1.

Now, referring to FIG. 2, the configuration of the video game device 3 will be described. FIG. 2 is a functional block diagram of the video game device 3.

Referring to FIG. 2, the video game device 3 includes, for example, a 128-bit CPU (Central Processing Unit) 31 for executing various programs. The CPU 31 executes a boot program stored in a boot ROM (not shown) and performs various processes such as the initialization of a memory (e.g., a work memory 32), after which the CPU 31 executes a video game program stored in the optical disk 4 to perform various game processes according to the video game program. Connected to the CPU 31 via a predetermined bus are the work memory 32, a video RAM (VRAM) 33, an external memory interface (I/F) 34, a controller I/F 35, a GPU (Graphics Processing Unit) 36, and the optical disk drive 37.

The work memory 32 is a memory area used by the CPU 31. A video game program, etc., necessary for the processing of the CPU 31 are stored as necessary in the work memory 32. For example, the work memory 32 stores a video game program and various data that are read out by the CPU 31 from the optical disk 4. The video game program, the various data, etc., stored in the work memory 32 are executed and used by the CPU 31. The VRAM 33 stores data of a game image to be displayed on the TV 2. The external memory I/F 34 communicably connects the video game device 3 and the memory card 5 to each other as the memory card 5 is plugged into a connector (not shown). Then, the CPU 31 accesses a backup memory in the memory card 5 via the external memory I/F 34. The controller I/F 35 communicably connects one or more external devices and the video game device 3 to each other as the external devices are plugged into connectors (not shown). For example, the controller 6 can be plugged into the connector via a connection cable so as to be connected to the video game device 3 via the controller I/F 35. The GPU 36, which may be, for example, a semiconductor chip capable of performing arithmetic operations necessary for 3D graphics display, processes the game image data, which has been processed by the CPU 31, and displays the game image on the TV 2. The optical disk drive 37 reads out data from the optical disk 4 placed in a predetermined read position, and outputs the data to the bus of the video game device 3.

Now, referring to FIG. 3, an exemplary golf game that is executed by the video game device 3 according to a golf game program stored in the optical disk 4 will be described. FIG. 3 shows an exemplary game image 20 of the golf game to be displayed on the TV 2 according to the golf game program executed by the video game device 3. The game image 20 is an image of a player object 21 making a shot as operated by the player, as viewed from behind. Displayed in front of the player object 21 is an image of the hole being played (hereinafter referred to as a "background image"). The golf game proceeds as the player of the video game device 3 hits a ball 22 toward a pin 23 drawn in the background image.

In the present golf game, the player operates the controller to select the club to be used for hitting the ball 22, and the power, the direction, the impact point position, the impact timing, etc., of the shot. Then, the shot is reproduced on the screen according to the player's operation of the controller. While the player cannot set the stance of the player object 21 making a shot in the present exemplary illustrative embodiment, the player may alternatively be allowed to set the stance in other exemplary illustrative embodiments. Shot parameters of the present golf game include pre-shot parameters and in-shot parameters. The pre-shot parameters are parameters that are set by the player before the shot action, and include the club to be used for hitting the ball 22, and the direction and the impact point position of the shot. The in-shot parameters are parameters that are determined by the timing of the operation by the player during the shot action, and include the power and the impact timing of the shot. Thereafter in the shot action, the trajectory of the ball 22 is calculated, and the final position to be reached by the ball 22 is determined, based on the pre-shot parameters and the in-shot parameters. The pre-shot parameters and the in-shot parameters are displayed against the background image in the form of a power gauge 24, an impact point object 25 and a selected club display object 27. For the club selected by the player, the selected club display object 27 shows the club number and the normal distance of the club. The target direction of the shot set by the player is indicated to the player by moving the background image left and right relative to the player object 21. The impact point position on the ball 22 for the shot set by the player is shown on the impact point object 25, which also shows the current lie condition. Thus, the impact point position is shown on the ball-shaped object representing the ball lying on the current lie. The power and the impact timing of the shot, which are determined by the timing of the operation by the player during the shot action, are shown by the power gauge 24, more specifically by the cursor movement along the power gauge 24 to be described below. Moreover, a turning point marker character (hereinafter referred to simply as a "turning point marker") 241 is displayed at a predetermined position along the power gauge 24 depending on the difficulty of the current lie of the ball 22, the characteristics of the character being used, etc. The method for displaying the turning point marker 241 and the position thereof will be described in detail below.

Now, referring to FIG. 4A to FIG. 4D and FIG. 5A to FIG. 5F, the cursor movement along the power gauge 24 during the shot action of the present golf game will be described. In the present exemplary illustrative embodiment, the player operates an operation button (specifically, the A button 62) three times during the shot action. The first operation is the shot action start operation, the second operation is the power determination operation, and the third operation is the impact timing determination operation. FIG. 4A to FIG. 4D are schematic diagrams illustrating how the cursor moves along the power gauge 24 if only the shot action start operation is performed during the shot action, i.e., if the A button 62 is operated only once during the shot action. FIG. 5A to FIG. 5F are schematic diagrams illustrating how the cursor moves if the shot action start operation, the power determination operation and the impact timing determination operation are performed during the shot action, i.e., if the A button 62 is operated three times to perform a complete shot action. Each solid arrow in these figures indicates the movement of a cursor 244. Each open arrow in these figures indicates the position of the cursor 244 along the power gauge 24 at which the A button 62 is operated.

In FIG. 4A to FIG. 4D, the power gauge 24 is displayed with its longitudinal axis lying in the left-right direction, and with the cursor 244 moving left and right along the power gauge 24. The turning point marker 241 is displayed on the power gauge 24, and a meet area 242 is displayed to extend over a predetermined range in the right half of the power gauge 24, with a best timing point 243 being located at the center of the meet area 242 in the left-right direction. The position along the power gauge 24 at which the turning point marker 241 is displayed is defined by marker position data to be described below that takes a value in the range from 0.00 to 1.00. Thus, the turning point marker 241 is superimposed on the power gauge 24 at a position according to the marker position data. The marker position data of 0.00 corresponds to the position of the best timing point 243, and the value of the marker position data gradually increases as the position moves to the left along the power gauge 24, with the marker position data of 1.00 corresponding to the left end of the power gauge 24 (see FIG. 4A). These values do not need to be displayed in the game image 20. In all of FIG. 4A to FIG. 4D and FIG. 5A to FIG. 5F, the turning point marker 241 is shown at an exemplary position that corresponds to the marker position data of 0.80 (i.e., a position 20% away from the left end of the power gauge 24, with 100% being the length from the left end of the power gauge 24 to the best timing point 243.

Figure 4A:
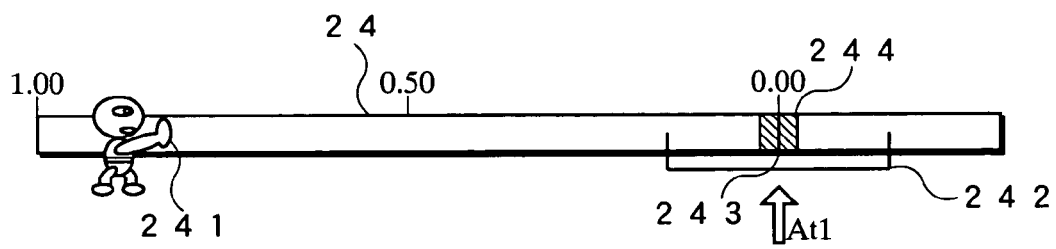
FIG. 4A is a schematic diagram illustrating a power gauge 24 of FIG. 3 before the shot action start operation is performed.

FIG. 4A shows the power gauge 24 before the shot action start operation is performed. Before the shot action start operation is performed, the cursor 244 is standing still with its center being aligned with the best timing point 243. In the present golf game, the shot action is started by the player activating the A button 62 while the cursor 244 is standing still at the position of the best timing point 243 (indicated by open arrow At1).

Figure 4B:
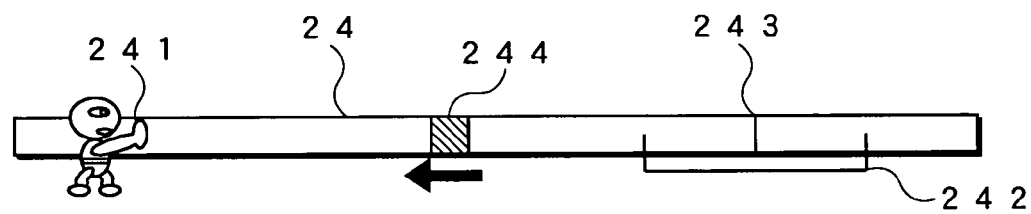
FIG. 4B is a schematic diagram illustrating the cursor movement along the power gauge 24 of FIG. 3 after the shot action start operation is performed.

Once the shot action start operation is performed, the cursor 244 starts moving leftward from the best timing point 243 toward the turning point marker 241 along the power gauge 24 at a predetermined speed (FIG. 4B). Then, as the cursor 244 reaches the turning point marker 241 (FIG. 4C) without the player performing the power determination operation to be described below, the moving direction of the cursor 244 is reversed at the turning point marker 241, after which the cursor 244 moves rightward at a predetermined speed. Then, as the cursor 244 reaches the best timing point 243 of the power gauge 24 without the player performing the power determination operation, the cursor 244 stops with its center being aligned with the best timing point 243 (FIG. 4D). This is the same state as that of FIG. 4A described above. Thus, if only the shot action start operation is performed during a shot action, the process regards the shot action as being incomplete, and waits for the player to perform the shot action start operation again.

Figure 5A:
FIG. 5A is a schematic diagram illustrating the power gauge 24 of FIG. 3 before the shot action start operation is performed.

Now, referring to FIG. 5A to FIG. 5F, how the cursor moves along the power gauge 24 if the shot action start operation, the power determination operation and the impact timing determination operation are performed during a shot action will be described. The power determination operation and the impact timing determination operation are also performed by the player activating the A button 62. FIG. 5A shows the power gauge 24 before the shot action start operation is performed, in the same state as that of FIG. 4A. Then, the shot action is started by the player activating the A button 62 (indicated by open arrow At1).

Figure 5B:
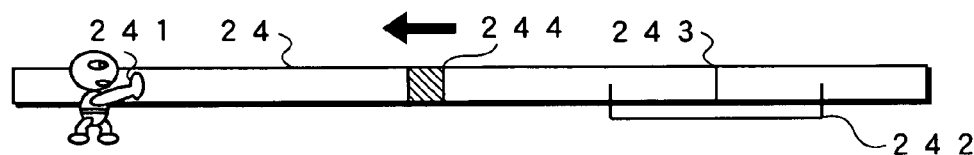
FIG. 5B is a schematic diagram illustrating the cursor movement along the power gauge 24 of FIG. 3 after the shot action start operation is performed.
Figure 5C:
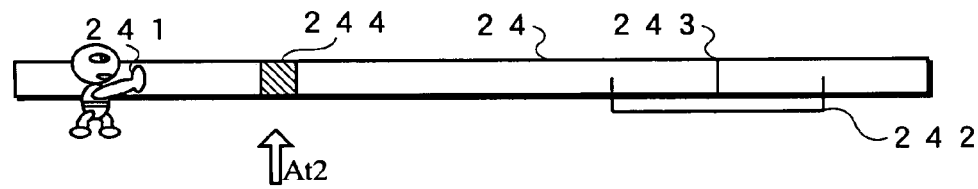
FIG. 5C is a schematic diagram illustrating the cursor movement along the power gauge 24 of FIG. 3 when the shot power is set at the illustrated position of the cursor 244.

Once the shot action start operation is performed, the cursor 244 starts moving leftward from the best timing point 243 toward the turning point marker 241 along the power gauge 24 at a predetermined speed (FIG. 5B). Then, as the player activates the A button 62 before the cursor 244 reaches the turning point marker 241 (indicated by open arrow At2), a shot power is set according to the position of the cursor 244 (FIG. 5C), and the cursor 244 continues to move leftward. Then, as the cursor 244 reaches the turning point marker 241 along the power gauge 24 (FIG. 5D), the moving direction of the cursor 244 is reversed at the turning point marker 241, after which the cursor 244 moves rightward at a predetermined speed. As indicated above, the power is set according to the position of the cursor 244, and a greater power is obtained as the position of the cursor 244 at the player's activation of the A button 62 is closer to the left end of the power gauge 24. However, the cursor 244 cannot move beyond the turning point marker 241. Thus, where the turning point marker 241 is positioned between the left end of the power gauge 24 and the best timing point 243, 100% of the power available under the situation is obtained if the position of the turning point marker 241 coincides with that of the cursor 244 at the player's activation of the A button 62. As the cursor 244 moves rightward away from the turning point marker 241, the power to be set decreases at a predetermined rate. While the present exemplary non-limiting implementation is directed to a case where the cursor 244 continues to move leftward after the player activates the A button 62 before the cursor 244 reaches the turning point marker 241, the moving direction of the cursor 244 may alternatively be reversed to the rightward direction at the player's activation of the A button 62.

If the cursor 244 reaches the turning point marker 241 of the power gauge 24 without the player performing the power determination operation (FIG. 4C), the moving direction of the cursor 244 is reversed, after which the cursor 244 moves rightward at a predetermined speed. Then, if the power determination operation is performed during the rightward movement of the cursor 244, a shot power is set according to the position of the cursor 244, and the cursor 244 continues to move rightward at a predetermined speed.

The impact timing of the shot is determined by the player activating the A button 62 again while the cursor 244 is moving rightward at a predetermined speed after the power determination operation. For example, if the player activates the A button 62 when the cursor 244 is at a position within the meet area 242 (open arrow At3), as illustrated in FIG. 5E, it is regarded that the ball 22 is properly struck by the club. If the player activates the A button 62 when the cursor 244 is just at the best timing point 243, it is regarded that the center of the ball 22 is struck by the center of the clubface, whereby the ball 22 will be shown to fly in the shot direction as set before the shot action. If the player activates the A button 62 when the cursor 244 is off the best timing point 243, the ball 22 will be shown to fly off the intended trajectory accordingly. For example, if the cursor 244 is off to the left or right with respect to the best timing point 243 at the activation of the A button 62, the ball 22 will be shown to slice or hook, respectively.

Figure 5D:
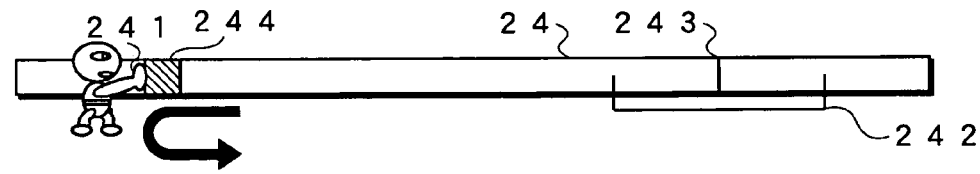
FIG. 5D is a schematic diagram illustrating the cursor movement along the power gauge 24 of FIG. 3 when the cursor 244 reaches the turning point marker 241.
Figure 5E:
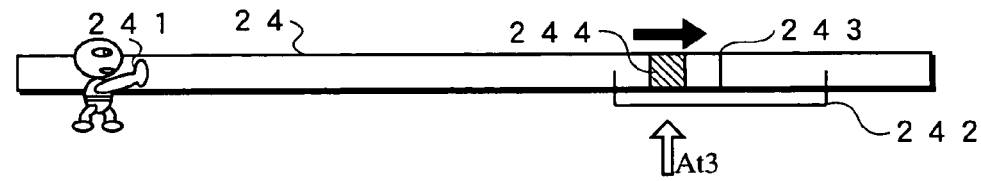
FIG. 5E is a schematic diagram illustrating an exemplary cursor movement along the power gauge 24 of FIG. 3 when the impact timing of the shot is set at the illustrated position of the cursor 244.
Figure 5F:
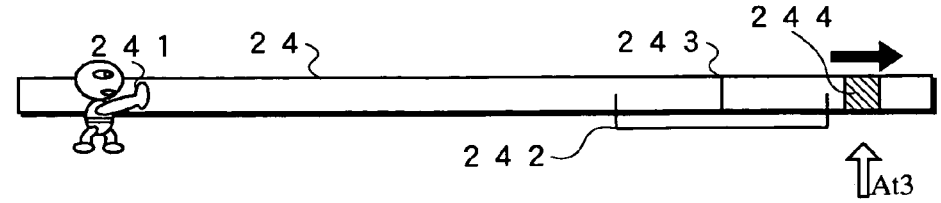
FIG. 5F is a schematic diagram illustrating another exemplary cursor movement along the power gauge 24 of FIG. 3 when the impact timing of the shot is set at the illustrated position of the cursor 244.

If the player activates the A button 62 when the cursor 244 is outside the meet area 242 (open arrow At3), as illustrated in FIG. 5F, or if the cursor 244 reaches the right end of the power gauge 24 without the player performing the impact timing determination operation, it is regarded that the ball 22 is mis-hit, whereby the shot will be shown to be a duffed shot or an air shot.

Now, the impact point object 25 will be described with reference to FIG. 6. FIG. 6 is a schematic diagram illustrating the impact point position and the lie, as indicated by the impact point object 25.

Referring to FIG. 6, the impact point object 25 includes a ball-shaped object 251, an impact point position object 252 indicating the impact point position on the ball 22 set by the player, and a lie object 253 indicating the condition of the lie on which the ball 22 is lying. The player can set the impact point position on the ball 22 by operating the cross-shaped control pad 67 before the shot action. There are a total of 49 different impact point positions (7 horizontal positions by 7 vertical positions) on the ball 22, from which the player can selectively set an intended impact point position. The impact point object 25 sets the impact point position as fixed coordinates with respect to the ball object 251. For example, an impact point position can be represented by an x coordinate selected from x-3 to x3 (x0 being the center in the horizontal direction) and a y coordinate selected from y-3 to y3 (y0 being the center in the vertical direction). The player can move the impact point position object 252 discretely through the coordinates x-3 to x3 by operating the cross-shaped control pad 67 in the horizontal direction, and discretely through the coordinates y-3 to y3 by operating the cross-shaped control pad 67 in the vertical direction.

In the shot action, the trajectory of the ball 22 is changed according to the impact point position set by the player. For example, if the impact point position object 252 is shifted leftward or rightward relative to the center (x0, y0) of the ball object 251, the ball 22 will have a slice or hook trajectory, respectively. If the impact point position object 252 is shifted upward or downward relative to the center of the ball object 251, the trajectory of the ball 22 will shift lower or higher, respectively. The degree of shift in the ball trajectory will increase as the impact point position object 252 is farther away from the center (x0, y0) of the ball object 251.

In the shot action, the post-landing run of the ball 22 will also change according to the impact point position set by the player. For example, if the impact point position object 252 is shifted upward or downward relative to the center (x0, y0) of the ball object 251, the run of the ball 22 will increase or decrease, respectively. The degree of change in the run will increase as the impact point position object 252 is farther away from the center (x0, y0) of the ball object 251. If the impact point position object 252 is significantly shifted downward relative to the center of the ball object 251, the ball 22 may be shown to land on the ground and then roll backward from the landing position due to backspin.

The impact point object 25 also includes the lie object 253 indicating the condition of the lie on which the ball 22 is lying. For example, the lie object 253 represents a course terrain (e.g., fairway, rough, bunker, green, etc.). The lie object 253 also indicates the condition of the terrain on which the ball 22 is placed (e.g., teed up, divot hole, light/heavy rough, fried egg, etc.). The lie object 253 can be obtained by referencing terrain data corresponding to the current coordinate position of the ball 22 in the game space, and selecting an appropriate terrain according to the terrain data. The ball object 251 is displayed as being placed on the lie object 253.

Figure 7:
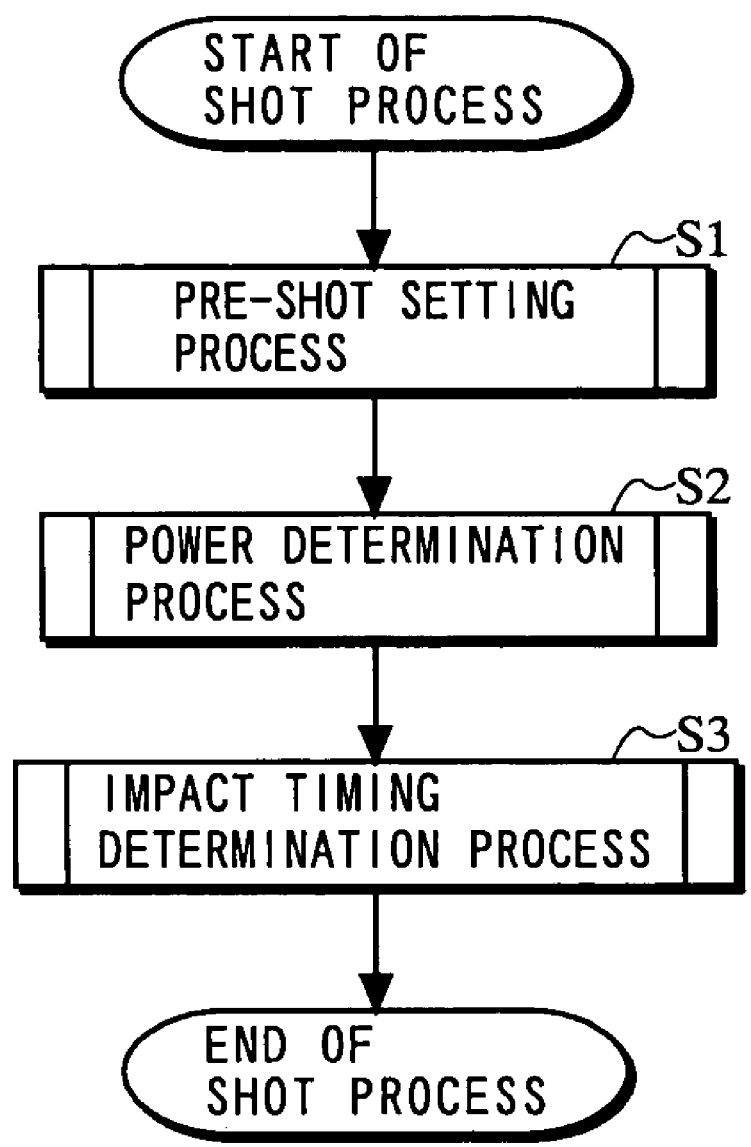
FIG. 7 is a flowchart illustrating the entire shot process executed by the video game device 3 of FIG. 1.
Figure 8:
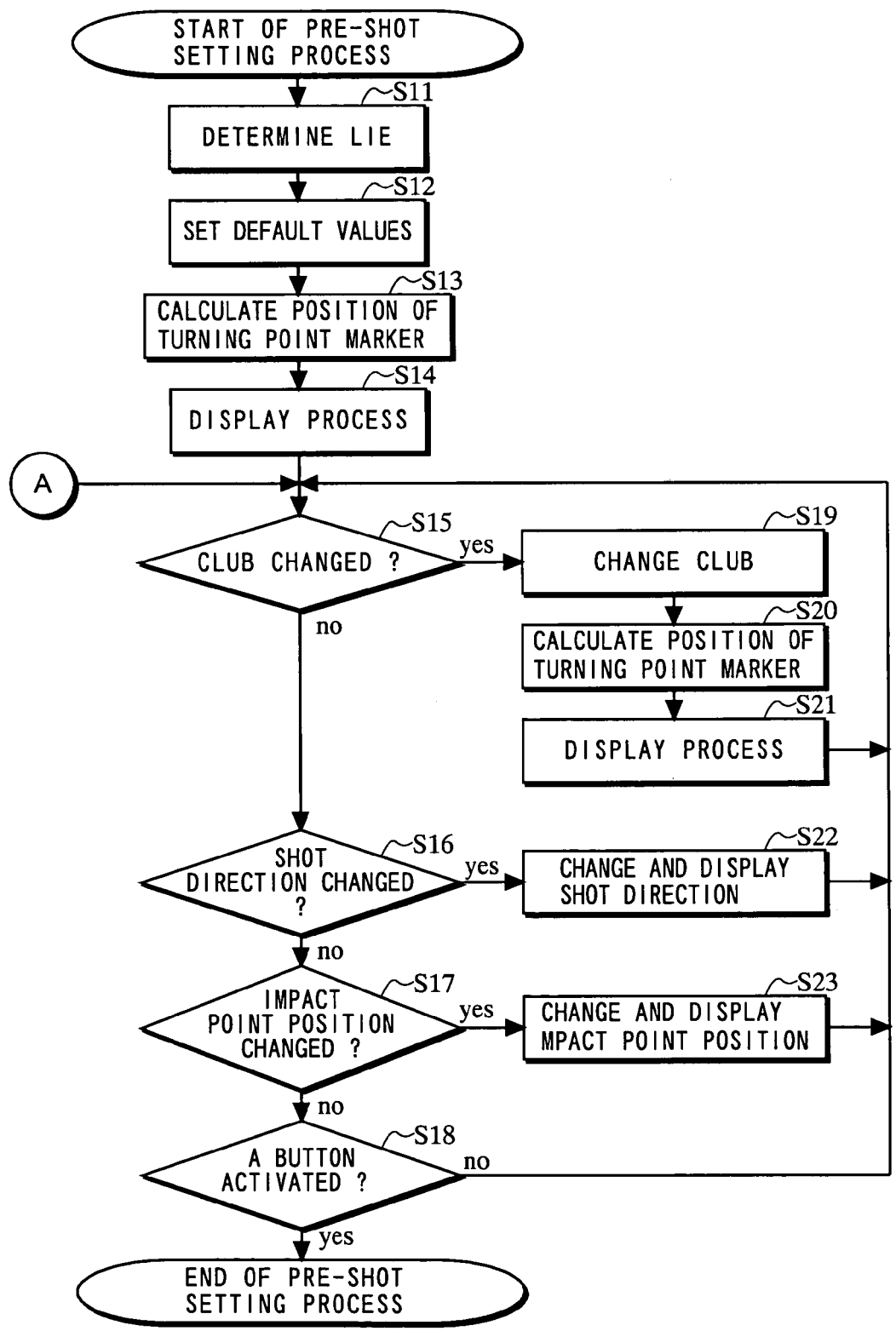
FIG. 8 is a flowchart illustrating the subroutine of step S1 of FIG. 7 in detail.
Figure 9:
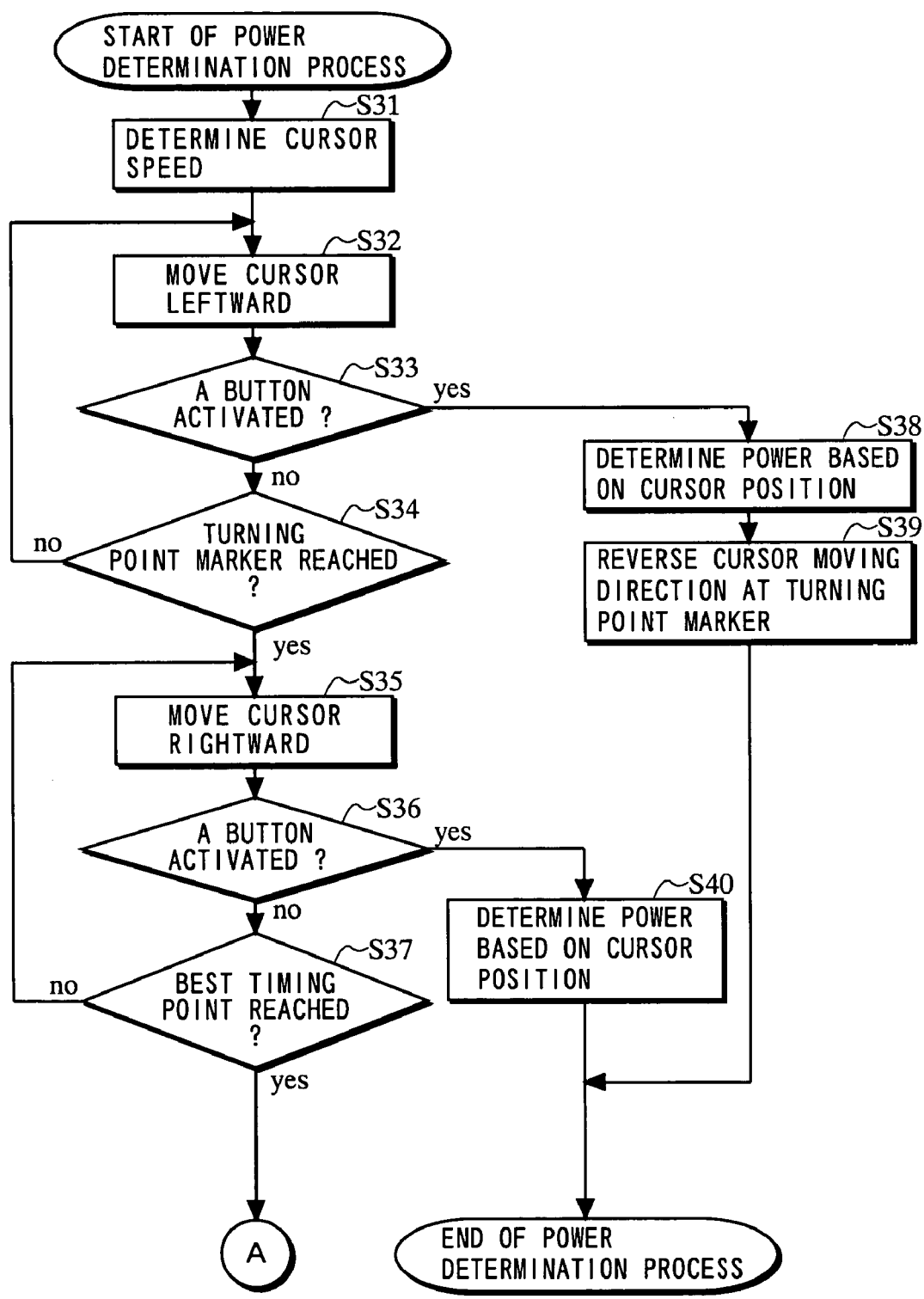
FIG. 9 is a flowchart illustrating the subroutine of step S2 of FIG. 7 in detail.

Now, referring to FIG. 7 to FIG. 10, the shot action process executed by the video game device 3 of the video game system 1 will be described. FIG. 7 is a flow chart illustrating the entire shot process executed by the video game device 3, FIG. 8 is a flowchart illustrating the subroutine of the pre-shot setting process of FIG. 7 in detail, FIG. 9 is a flowchart illustrating the subroutine of the power determination process of FIG. 7 in detail, and FIG. 10 is a flowchart illustrating the subroutine of the impact timing determination process of FIG. 7 in detail.

As the video game device 3 is turned ON, the CPU 31 of the video game device 3 executes the boot program stored in the boot ROM (not shown), and various units such as the work memory 32 are initialized. Then, the golf game program stored in the optical disk 4 is read out into the work memory 32 via the optical disk drive 37, and the golf game program is started. Then, the game space is rendered on the TV 2 via the GPU 36, thereby starting the game.

First, the player of the video game device 3 selects a course and a character of the player object 21 that the player wishes to play with, while watching the game image displayed on the TV 2. These selections can be made by the player operating the various input sections provided on the controller 6. Then, the game image 20 is displayed on the TV 2 according to the course and the character selected by the player (see FIG. 3). The flowchart of FIG. 7 illustrates the process to be executed after the process above.

Referring to FIG. 7, the CPU 31 first sets the pre-shot parameters for the hole being played (step S1). Specifically, the CPU 31 sets the club to be used for hitting the ball 22, the direction of the shot, and the impact point position of the shot, which are determined by the player before the shot action.

Then, the CPU 31 determines the shot power (step S2). The power determination process is performed as follows. As the player activates the A button 62 while watching, in the game image, the movement of the cursor 244 along the power gauge 24 (see FIG. 5A to FIG. 5C), the CPU 31 determines the shot power according to the position of the cursor 244 at the player's activation of the A button 62.

Then, the CPU 31 determines the impact timing of the shot (step S3). Then, the trajectory and the run of the ball 22 will be reproduced on the TV 2 based on the pre-shot parameters set in step S1 and the power and the impact timing of the shot determined in step S2. The impact timing determination process is performed as follows. As the player activates the A button 62 while watching, in the game image, the movement of the cursor 244 along the power gauge 24 (see FIG. 5C to FIG. 5F), the CPU 31 determines the impact timing according to the position of the cursor 244 at the player's activation of the A button 62. After the completion of step S3, the CPU 31 terminates the shot process. The golf game proceeds as the shot process is repeated.

Data to be used in the shot process include the current ball position data, a club table, a trajectory shift table, impact point position data, terrain data, etc.

The ball position data represents, in three-dimensional coordinates, the current position of the ball 22 in the game space in which the game is being played. The club table defines, for each club-lie combination and for each character, a shot distance and a shot height that is obtained if the ball 22 is hit with the maximum power. The trajectory shift table defines the degree of shift in the ball trajectory for each combination of the ball striking conditions, including the impact point position, which as described above is set with respect to the center of the ball 22, and the impact timing. The terrain data represents the terrain to be reproduced in the game space, indicating the overall undulations of each hole, the lie (e.g., the type of the ground surface), and the presence/absence of an obstruction such as a tree. The terrain data also indicates the influence that each terrain gives upon contact with the ball 22 (e.g., the rebound coefficient, the decrease in the run, the influence of the angle of slope, etc.). The club table, the trajectory shift table and the terrain data are pre-stored in the optical disk 4 as a part of the video game program. During the execution of the video game program, the CPU 31 reads out and stores these data in the work memory 32 as necessary.

The process of setting the pre-shot parameters in step S1 will now be described in detail. Referring to FIG. 8, the CPU 31 detects the current lie on which the ball 22 is lying (step S11). Specifically, the CPU 31 references the terrain data corresponding to the current coordinate position of the ball 22 in the game space. Then, the CPU 31 determines the final lie taking into consideration other parameters such as the ball trajectory of the last shot. For example, the CPU 31 determines, from the terrain data, the course terrain (e.g., fairway, rough, bunker, green, etc.) and the condition of the terrain on which the ball 22 is placed (e.g., teed up, divot hole, light/heavy rough, etc.), and determines other parameters dependent on the last shot (how deeply submerged in sand in a bunker, etc.) by using a random number, etc., to determine the final lie.

Then, the CPU 31 sets the pre-shot parameters to their respective default values based on the remaining distance from the ball 22 to the pin 23 and the lie determined in step S11 (step S12). For example, the default club is a club that is appropriate for the remaining distance to the pin and the lie (e.g., a driver (1W) for a tee shot at a par 5 hole, a sand wedge (SW) for a bunker shot). The default shot direction is typically the direction from the current position of the ball 22 toward the pin 23. The default impact point position is the center of the ball 22.

Then, the CPU 31 calculates the position where the turning point marker 241 is to be displayed, based on the character making a shot, the lie before the shot (the lie determined in step S11), the club being selected, and the environmental factor of the hole being played (step S13). Thus, shot parameters used in the calculation of the position of the turning point marker 241 include the character making a shot, the lie before the shot, the club being selected, and the environmental factor of the hole being played. Now, referring to FIG. 11 to FIG. 14, data tables that are used when the CPU 31 calculates the position of the turning point marker 241 will be described. FIG. 11 shows a character table, FIG. 12 shows a turning point settings table, FIG. 13 shows a lie-club compatibility table, and FIG. 14 shows an environmental factor table. These tables are pre-stored in the optical disk 4 as a part of the video game program. During the execution of the video game program, the CPU 31 reads out and stores these data in the work memory 32 as necessary.

Referring to FIG. 11, the character table contains each character that can be selected as the player object 21 and the associated turning point setting. For example, the character table contains Characters 1, 2, 3, . . . , from which the player can select the character to play with, and Turning Point Settings A, B, C, associated with the characters. Some characters may share the same turning point setting. The turning point setting is involved in the determination of the position of the turning point marker 241 for the associated character. Thus, different characters can be distinguished from each other by the character table. In step S13, the CPU 31 references the character table to retrieve the turning point setting associated with the character being selected as the player object 21. For example, where Character 1 is selected, the CPU 31 retrieves Turning Point Setting A.

Referring to FIG. 12, the turning point settings table defines data for determining the position of the turning point marker 241 for each lie and for each turning point setting. Specifically, each data defined in the turning point settings table is a value indicating how far to the left the turning point marker 241 is to be displayed with respect to the best timing point 243 along the power gauge 24, 0.00 corresponding to the best timing point 243 and 1.00 corresponding to the left end of the power gauge 24. Hereinafter, the data will be referred to as "marker position data". Thus, the turning point marker 241 is displayed at the best timing point 243 along the power gauge 24 if the marker position data is 0.00, and at the left end of the power gauge 24 if the marker position data is 1.00. For marker position data of 0.50, 0.75 and 0.25, the turning point marker 241 will be displayed in the middle between the best timing point 243 and the left end of the power gauge 24, at a position shifted rightward by ¼ from the left end of the power gauge 24, and at a position shifted leftward by ¼ from the best timing point 243, respectively. For example, if the ball 22 is teed up (i.e., the easiest lie to hit from), the marker position data is set to 1.00. For Turning Point Setting A, the marker position data is set to 0.80 for a "heavy rough" lie, indicating that the turning point marker 241 will be displayed at a position shifted leftward by 0.80 from the best timing point 243 for such a lie. Basically, the turning point marker 241 is displayed farther away from the left end of the power gauge 24 as the difficulty of the lie increases, as with Setting A shown in FIG. 12. However, the settings may be varied to distinguish various characters from each other. For example, for a turning point setting that is associated with a character with relatively poor golf skills (e.g., Setting B as opposed to Setting A), the turning point marker 241 may be displayed farther away from the left end of the power gauge 24. Moreover, for a turning point setting that is associated with a character particularly good at hitting from a certain lie, the turning point marker 241 may be displayed closer to the left end of the power gauge 24 for that certain lie relative to other turning point settings (for example, Setting C is associated with a character particularly good at hitting from a "bunker". Thus, with the turning point settings table defining different positions of the turning point marker 241 for different turning point settings associated with different characters, various characters can be distinguished from each other. The CPU 31 references the turning point settings table in step S13, and obtains marker position data corresponding to the obtained turning point setting and the lie determined in step S11. For example, where the turning point setting is Setting A and the lie is "light rough", the CPU 31 obtains marker position data of 0.90.

Referring to FIG. 13, the lie-club compatibility table defines, in terms of the marker position data as described above, the compatibility between each club that can be selected by the player and each lie. For example, the marker position data is set to 0.95 for the combination of 3-iron (3I) and "light rough", indicating that the turning point marker 241 will be displayed at a position shifted leftward by 0.95 from the best timing point 243 for such a club-lie combination. The lie-club compatibility table is designed so that the turning point marker 241 will be displayed closer to (or farther away from) the left end of the power gauge 24 for a club-lie combination that would be more appropriate (or less appropriate) in real golf. Moreover, the lie-club compatibility table is designed so that, for a difficult lie to hit from, the turning point marker 241 will be displayed farther away from the left end of the power gauge 24 generally for any club. The CPU 31 references the lie-club compatibility table in step S13, and obtains marker position data corresponding to the club number set in step S12 and the lie determined in step S11. For example, where the club number is 3I and the lie is "light rough", the CPU 31 obtains marker position data of 0.95.

Referring to FIG. 14, the environmental factor table defines, in terms of the marker position data as described above, the relationship between the environmental factor of the hole being played and the difficulty of a shot under the influence of the environmental factor. In the environmental factor table, the marker position data is set to 1.00 for an environmental factor of "daytime-fair" under which one can play most stably. For example, if the environmental factor of the hole being played is "dusk-fair", the marker position data is 0.90, whereby the turning point marker 241 is displayed at a position shifted leftward by 0.90 from the best timing point 243. The environmental factor table is designed so that the turning point marker 241 will be displayed farther away from the left end of the power gauge 24 for an environmental factor that would make the shot more difficult in real golf. The CPU 31 references the environmental factor table in step S13, and obtains marker position data corresponding to the environmental factor of the hole being played. For example, the CPU 31 obtains marker position data of 0.90 for "dusk-fair".

In step S13, the CPU 31 references the character table, the turning point settings table, the lie-club compatibility table and the environmental factor table to obtain respective marker position data values, and multiplies the obtained marker position data values together to obtain the position where the turning point marker 241 is to be displayed. For example, assume that the player object 21 being selected is Character 1 (Turning Point Setting A), the lie determined in step S11 is "light rough", the club number set in step S12 is 3I, and the environmental factor of the hole being played is "dusk-fair". Then, the CPU 31 multiplies together 0.90 (for Setting A-"light rough"), 0.95 (for 3I-"light rough"), and 0.90 (for "dusk-fair"), as follows:

$$0.90 \times 0.95 \times 0.90 \approx 0.77.$$

Thus, the CPU 31 sets the position of the turning point marker 241 to 0.77.

Then, the CPU 31 forms a game image based on the resulting parameters from steps S11 to S13, and displays the game image on the TV 2 (step S14). Specifically, the number of the club set in step S12 is displayed in the selected club display object 27. The target direction of the shot set in step S12 is indicated to the player by moving the background image left and right relative to the player object 21. The impact point position for the shot set in step S12 is indicated to the player by the position of the impact point position object 252 on the impact point object 25. The lie determined in step S111 is indicated to the player by the lie object 253 of the impact point object 25. Moreover, the turning point marker 241 is displayed on the power gauge 24 based on the marker position data obtained in step S13. Now, referring to FIG. 15A to FIG. 15F, the turning point marker 241 displayed on the power gauge 24 of the game image 20 will be described. FIG. 15A to FIG. 15F are each an example of a portion of the game image 20, showing the turning point marker 241, which is displayed at a position according to the lie, and the impact point object 25.

Figure 15A:
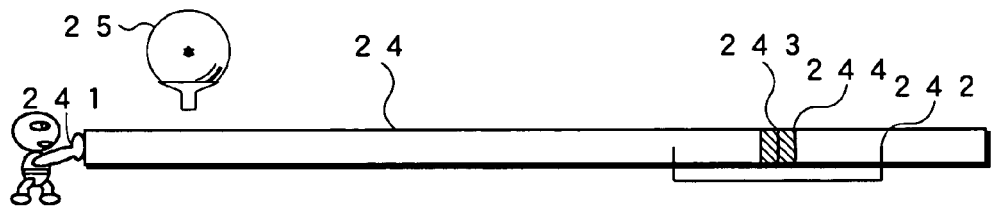
FIG. 15A is an example of a portion of the game image 20 of FIG. 3, showing the turning point marker 241 and the impact point object 25 for a "tee shot" lie.

FIG. 15A shows the turning point marker 241 and the impact point object 25 for a "tee shot" lie. On a tee shot, the ball is shown to be teed up in the impact point object 25, and the turning point marker 241 is displayed at a position corresponding to marker position data of 1.00. In this case, the turning point marker 241 is displayed at the left end of the power gauge 24. A cursor position closer to the left end of the power gauge 24 indicates more power, as described above, and the left end of the power gauge 24 typically corresponds to a 100% power. The position of the turning point marker 241 indicates the maximum power available under the current situation. The power is decreased at a predetermined rate as the cursor position moves rightward away from the left end of the power gauge 24, and the position around the best timing point 243 typically corresponds to a 0% power.

Figure 15B:
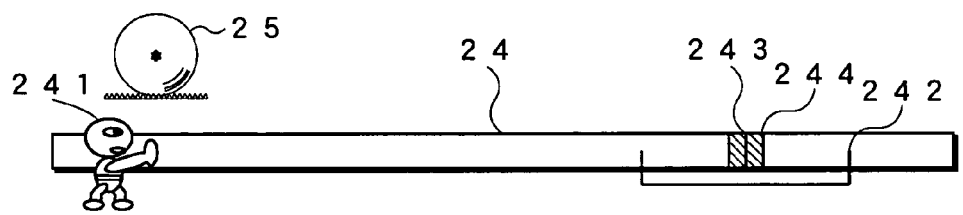
FIG. 15B is an example of a portion of the game image 20 of FIG. 3, showing the turning point marker 241 and the impact point object 25 for a "light rough" lie.
Figure 15C:
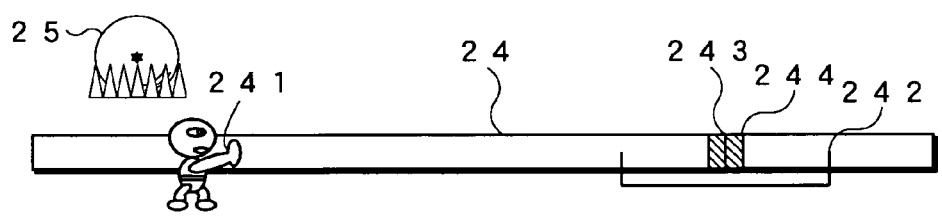
FIG. 15C is an example of a portion of the game image 20 of FIG. 3, showing the turning point marker 241 and the impact point object 25 for a "heavy rough" lie.
Figure 15D:
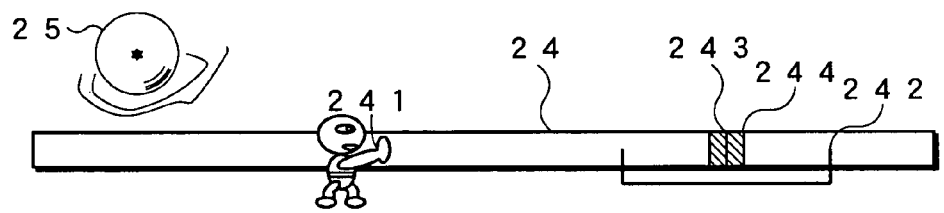
FIG. 15D is an example of a portion of the game image 20 of FIG. 3, showing the turning point marker 241 and the impact point object 25 for a "bunker (normal)" lie.
Figure 15E:
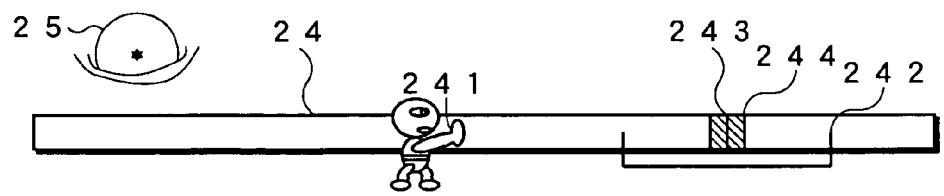
FIG. 15E is an example of a portion of the game image 20 of FIG. 3, showing the turning point marker 241 and the impact point object 25 for a "bunker (fried egg)" lie.

FIG. 15B to FIG. 15E indicate how the position of the turning point marker 241 is shifted from that of FIG. 15A for the same club number as the lie changes. The change of the lie is indicated in the impact point object 25 in these figures. FIG. 15B is for a "light rough" lie. In FIG. 15B, the impact point object 25 shows a ball lying on the lie object 253 representing a "light rough", and the turning point marker 241 is displayed at a 0.80 position, for example. FIG. 15C is for a "heavy rough" lie. In FIG. 15C, the impact point object 25 shows a ball lying on the lie object 253 representing a "heavy rough", and the turning point marker 241 is displayed at a 0.65 position, for example. FIG. 15D is for a "bunker (normal)" lie. In FIG. 15D, the impact point object 25 shows a ball lying on the lie object 253 representing a "bunker", and the turning point marker 241 is displayed at a 0.50 position, for example. FIG. 15E is for a "bunker (fried egg)" lie. In FIG. 15E, the impact point object 25 shows a ball submerged in the lie object 253 representing a "bunker", and the turning point marker 241 is displayed at a 0.40 position, for example. As shown in FIG. 15A to FIG. 15E, the gauge length of the power gauge 24 is constant in any case.

As indicated above, a cursor position closer to the left end of the power gauge 24 indicates more power, and the power is decreased at a predetermined rate as the cursor position moves rightward away from the left end of the power gauge 24. The portion of the power gauge 24 to the left of the turning point marker 241 is not used for setting the shot power. Therefore, as the position of the turning point marker 241 changes, the player can readily see where the turning point marker 241 is being currently positioned with respect to the left end of the power gauge 24. Therefore, the player can readily determine how limited the power available is, and thus how difficult it is to play the current situation. Moreover, the player can readily estimate the influence of the power limitation on the shot distance, and thus to estimate the shot distance available under the current situation.

Figure 4C:
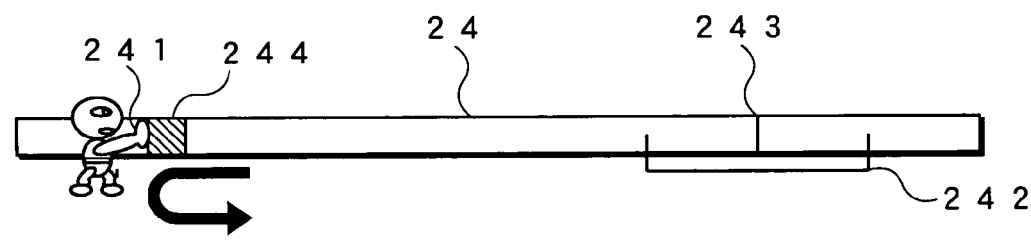
FIG. 4C is a schematic diagram illustrating the cursor movement along the power gauge 24 of FIG. 3 when a cursor 244 reaches a turning point marker 241 without the player performing the power determination operation after performing the shot action start operation.
Figure 4D:
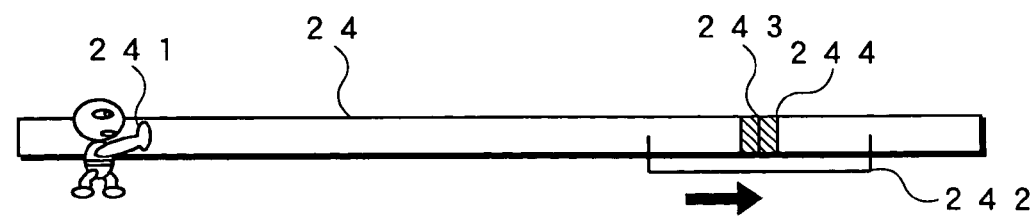
FIG. 4D is a schematic diagram illustrating the cursor movement along the power gauge 24 of FIG. 3 when the cursor 244 reaches the best timing point 243 without the player performing the power determination operation after performing the shot action start operation.

As indicated above, the position of the turning point marker 241 is where the moving direction of the cursor 244 is reversed (see FIG. 4C and FIG. 5D). Therefore, as the position of the turning point marker 241 shifts away from the left end of the power gauge 24, the rhythm of the movement of the cursor 244 changes. Thus, by changing the position of the turning point marker 241, it is possible to change the rhythm and the difficulty of the power determination operation and the impact timing determination operation. Specifically, as the position of the turning point marker 241 shifts to the right, the moving direction of the cursor 244 is reversed more quickly, forcing the player to perform the power determination operation and the impact timing determination operation more quickly, whereby the difficulty of the operation is increased. The difficulty of the power determination operation is increased due to a decrease in the interval from when the cursor 244 first comes to a desired position along the power gauge 24 until the cursor 244 comes back to the desired position after the turn. The difficulty of the impact timing determination operation is increased due to a decrease in the interval between the power determination operation and the impact timing determination operation.

While the turning point marker 241 is superimposed on the power gauge 24 in FIG. 15A to FIG. 15F, it may alternatively be displayed in other positions such as above or below the power gauge 24.

Figure 15F:
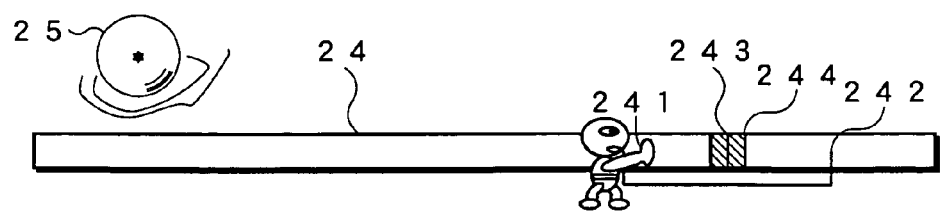
FIG. 15F is an example of a portion of the game image 20 of FIG. 3, showing the turning point marker 241 and the impact point object 25 when an inappropriate club is selected for a "bunker (normal)" lie; and, FIG. 16 is an exemplary cursor speed table used in step S2 and step S3 of FIG. 7.

FIG. 15F shows a case where an inappropriate club (e.g., a driver (1W)) is selected for a "bunker (normal)" lie. In this case, the turning point marker 241 is displayed at a 0.10 position, for example. Thus, if an inappropriate club is selected for the current lie, the position of the turning point marker 241 shifts more to the right, further decreasing the maximum power available for the shot and increasing the difficulty of the power determination operation and the impact timing determination operation. As shown in FIG. 15F, the gauge length of the power gauge 24 is constant also in this case.

Referring back to FIG. 8, the CPU 31 determines whether or not the player has changed any of the shot parameters (steps S15 to S17). The determination can be made by identifying the input section of the controller 6 operated by the player. For example, the CPU 31 determines whether or not the club to be used is changed (step S15) by determining whether or not the main control stick 61 is operated up or down by the player. Similarly, the CPU 31 determines whether or not the shot direction is changed (step S16) by determining whether or not the main control stick 61 is operated left or right, and determines whether or not the impact point position is changed (step S17) by determining whether or not the cross-shaped control pad 67 is operated up, down, left or right.

If the CPU 31 determines in step S15 that the club to be used is changed, the CPU 31 accordingly updates club data, one of the shot parameters (step S19). Then, the CPU 31 calculates the position where the turning point marker 241 is to be displayed based on the club number indicated by the updated club data (step S20), and displays, in the game image, the selected club display object 27 corresponding to the updated club data and the turning point marker 241 at the newly calculated position (step S21). Then, the CPU 31 returns to step S15 to repeat the process. The calculation of the position of the turning point marker 241 in step S20 and the process of displaying the turning point marker 241 in step S21 are similar to step S13 and step S14, respectively, and thus will not be further described below.

If the CPU 31 determines in step S16 that the shot direction is changed, the CPU 31 updates direction data, one of the shot parameters, and the updated target direction is indicated to the player by moving the background image left and right relative to the player object 21 (step S22). Then, the CPU 31 returns to step S15 to repeat the process.

If the CPU 31 determines in step S17 that the impact point position is changed, the CPU 31 updates impact point position data, one of the shot parameters, and accordingly changes the position of the impact point position object 252 on the impact point object 25 (step S23). Then, the CPU 31 returns to step S15 to repeat the process.

If the CPU 31 determines through steps S15 to S17 that none of the shot parameters is changed by the player, the CPU 31 then determines whether or not the A button 62 is operated by the player (step S18). If the A button 62 is not operated by the player, the CPU 31 returns to step S15 to repeat the process. If the CPU 31 detects the activation of the A button 62, the CPU 31 exits the subroutine of the pre-shot setting process and proceeds to step S2.

The power determination process of step S2 will now be described in detail. Referring to FIG. 9, the CPU 31 references a cursor speed table to determine the cursor speed corresponding to the lie determined in step S11 (step S31). FIG. 16 is an exemplary cursor speed table referenced by the CPU 31 in step S31. This table is also pre-stored in the optical disk 4 as a part of the video game program. During the execution of the video game program, the CPU 31 reads out and stores the table in the work memory 32 as necessary.

Referring to FIG. 16, the cursor speed table shows the various lies with associated cursor speeds. The cursor speed indicates the speed at which the cursor 244 moves left and right along the power gauge 24, with a cursor speed of a greater value indicating a faster cursor movement. For example, the cursor speed for a "tee shot" lie is the reference speed "1", and the cursor speed for a "heavy rough" lie is "3". The cursor speed table is designed so that a higher cursor speed is associated with a lie that is generally considered to be more difficult to hit from. For example, if the lie is determined in step S11 to be a "light rough", the CPU 31 references the cursor speed table and retrieves the cursor speed "2". This means that the cursor will move at a speed twice as high as that for a tee shot.

Then, the CPU 31 starts moving the cursor 244, placed within the power gauge 24, leftward along the power gauge 24 (step S32, see FIG. 4B and FIG. 5B), and waits for the operation of the A button 62 by the player (step S33). If the A button 62 is activated by the player, the CPU 31 proceeds to step S38. Otherwise, the CPU 31 proceeds to step S34.

In step S34, the CPU 31 determines whether or not the cursor 244 has reached the turning point marker 241 (see FIG. 4C). If the cursor 244 has not reached the turning point marker 241, the CPU 31 returns to step S32 to repeat the process. If the cursor 244 has reached the turning point marker 241, the CPU 31 reverses the moving direction of the cursor 244 at the position of the turning point marker 241 so that the cursor 244 thereafter moves rightward along the power gauge 24 (step S35, see FIG. 4C), and waits for the operation of the A button 62 by the player (step S36). If the A button 62 is activated by the player, the CPU 31 proceeds to step S40. Otherwise, the CPU 31 proceeds to step S37.

In step S37, the CPU 31 determines whether or not the cursor 244 has reached the best timing point 243 (see FIG. 4D). If the cursor 244 has not reached the best timing point 243 of the power gauge 24, the CPU 31 returns to step S35 to repeat the process. If the cursor 244 has reached the best timing point 243 of the power gauge 24, the CPU 31 returns to step S15 to repeat the pre-shot setting process.

As the turning point marker 241 is closer to the best timing point 243 of the power gauge 24, and as the cursor speed is higher, the cursor 244 reaches the turning point marker 241 (step S34) more quickly, and the cursor 244, moving back from the turning point marker 241, reaches the best timing point 243 (step S37) more quickly. As described above, as the current shot is more difficult to play, the turning point marker 241 is located farther away from the left end of the power gauge 24. Then, it is more difficult for the player to operate the A button 62 at an intended cursor position in step S33 or S36. Thus, the difficulty of a shot is linked with the difficulty of the play of the game.

In step S38, the CPU 31 determines the power for the shot action based on the position of the cursor 244 at the player's activation of the A button 62 in step S33 (see open arrow At2 in FIG. 5C), and proceeds to the following step. As indicated above, the power is set according to the position of the cursor 244, and a greater power is obtained as the position of the cursor 244 at the player's activation of the A button 62 is closer to the left end of the power gauge 24. As the cursor 244 moves rightward away from the left end of the power gauge 24, the power to be set decreases at a predetermined rate. In the process of step S38, the power determined may be used as it is, or may alternatively be increased or decreased based on a random number value.

Then, after the cursor 244 reaches the turning point marker 241, the CPU 31 reverses the moving direction of the cursor 244 so that the cursor 244 thereafter moves rightward along the power gauge 24 (step S39, see FIG. 5D). Then, the CPU 31 exits the subroutine of the power determination process and proceeds to step S3.

Also in step S40, the CPU 31 determines the power for the shot action based on the position of the cursor 244 at the player's activation of the A button 62 in step S36, after which the CPU 31 exits the subroutine of the power determination process and proceeds to step S3. Again, the power is set according to the position of the cursor 244, and a greater power is obtained as the position of the cursor 244 at the player's activation of the A button 62 is closer to the left end of the power gauge 24. As the cursor 244 moves rightward away from the left end of the power gauge 24, the power to be set decreases at a predetermined rate.

The impact timing determination process of step S3 will now be described in detail. Referring to FIG. 10, the CPU 31 continues to move the cursor 244, placed within the power gauge 24, rightward along the power gauge 24 (step S41), and waits for the operation of the A button 62 by the player (step S42). If the A button 62 is activated by the player, the CPU 31 proceeds to step S45. Otherwise, the CPU 31 proceeds to step S43.

In step S43, the CPU 31 determines whether or not the cursor 244 has reached the right end of the power gauge 24. If the cursor 244 has not reached the right end of the power gauge 24, the CPU 31 returns to step S41 to repeat the process. Otherwise, the CPU 31 proceeds to step S44.

As the turning point marker 241 is closer to the right end of the power gauge 24, and as the cursor speed is higher, the cursor 244 reaches the right end of the power gauge 24 (step S43) more quickly, and the cursor 244 reaches the best timing point 243 more quickly. As described above, as the current shot is more difficult to play, the turning point marker 241 is located farther away from the left end of the power gauge 24. Also in this case, it is more difficult for the player to operate the A button 62 at an intended cursor position in step S42. Thus, the difficulty of a shot is linked with the difficulty of the play of the game.

In step S45, the CPU 31 stops the movement of the cursor 244 along the power gauge 24, and determines whether the position at which the cursor 244 is stopped is within the meet area 242 (see FIG. 5E) or not (see FIG. 5F) (step S46). If the position at which the cursor 244 is stopped is within the meet area 242, the CPU 31 proceeds to step S47. Otherwise, the CPU 31 proceeds to step S44.

In step S47, the CPU 31 determines the power and the impact timing according to the position at which the cursor 244 is stopped in step S45. For example, if the cursor 244 coincides with the best timing point 243, the CPU 31 regards that the center of the ball is struck by the sweet spot of the clubface, whereby the CPU 31 will perform the shot process with the power as determined in step S38 or S40 and with the impact point position data as set in the pre-shot setting process. If the cursor 244 is shifted leftward from the best timing point 243, the CPU 31 regards that the club hits a point on the ball that is shifted leftward by a distance according to the distance between the cursor 244 and the best timing point 243. In this case, the CPU 31 decreases the power as determined in step S38 or S40 by a certain amount according to the distance between the cursor 244 and the best timing point 243, and shifts the impact point position as set in the pre-shot setting process leftward by a certain amount according to the distance between the cursor 244 and the best timing point 243. If the cursor 244 is shifted rightward from the best timing point 243, the CPU 31 regards that the club hits a point on the ball that is shifted rightward by a distance according to the distance between the cursor 244 and the best timing point 243. In this case, the CPU 31 decreases the power as determined in step S38 or S40 by a certain amount according to the distance between the cursor 244 and the best timing point 243, and shifts the impact point position as set in the pre-shot setting process rightward by a certain amount according to the distance between the cursor 244 and the best timing point 243.

Then, the CPU 31 calculates the trajectory data and the run data using the current values of the shot parameters (step S48), and proceeds to step S49. The shot parameter data used by the CPU 31 in step S48 include the current ball position data, the current values of the shot parameters (the club data and the direction data), the power and the impact point position data as determined in step S47, and the terrain data.

The CPU 31 calculates the shot distance and the shot height corresponding to the selected club and the lie, and calculates the trajectory data, starting from the current coordinate position of the ball, by using the direction data corresponding to the selected target direction and the trajectory shift data corresponding to the determined power data and impact point position data. The CPU 31 may, in some cases, calculate the trajectory data while varying the trajectory shift data based on a random number value. Then, the CPU 31 calculates the landing position data, i.e., the coordinates of the final point of the obtained trajectory data. Then, the CPU 31 calculates the run data based on the terrain data around the landing position based on the landing position data. For example, the CPU 31 calculates the run data along the terrain from the landing position to the final ball position based on the angle at which the ball trajectory meets the ground at the landing position, the change in the run corresponding to the determined impact point position, and the influence of the terrain data on the ball. The trajectory data and the run data represent, each in terms of a collection of coordinate points in the game space, the calculated trajectory and the calculated run, respectively.

In step S44, the CPU 31 performs a mis-hit process, and proceeds to step S49. For example, the CPU 31 regards the shot as an air shot, a shot with a very weak contact, or a duffed shot, and calculates the trajectory data and the run data such that the ball does not move at all or rolls to a point near the original ball position.

In step S49, the CPU 31 reproduces the shot in the game image on the TV 2, by showing how the ball is shot from the original ball position, hits the ground, and rolls to the new ball position, based on the trajectory data and the run data calculated in step S48 or S44. Then, the CPU 31 exits the subroutine of the impact timing determination process.

While the present exemplary illustrative embodiment has been described with respect to a shot process, the exemplary illustrative embodiment can also be applied to a putt process. In such a case, putt parameters determined by the player's operation of the controller include putt direction data and putt power data. Putt conditions include the character making a putt, the type of the putting green grass ("fast green", "normal green" or "slow green"), etc. Thus, the position of the turning point marker 241 is changed depending on the character making the putt and the type of the putting green grass.

Specifically, a turning point settings table as shown in FIG. 12, for example, may be used to define the position of the turning point marker 241 for "green" for each turning point setting. For example, a turning point setting associated with a character that is poorer at putting is defined so that the turning point marker 241 is displayed farther away from the left end of the power gauge 24. Moreover, a lie-club compatibility table as shown in FIG. 13 may be used to define the position of the turning point marker 241 for each type of putting green grass. For example, a "fast green", on which putting is more difficult, may be associated with a value such that the turning point marker 241 is away from the left end of the power gauge 24. Note that only a putter can be selected for a putt. The putt operation is performed in a manner similar to that for the shot operation as described above with reference to FIG. 4A to FIG. 4D and FIG. 5A to FIG. 5F. However, the impact timing determination operation can be omitted in the putt operation. Thus, the first operation of the A button 62 is the putt action start operation, which initiates the leftward movement of the cursor. The second operation of the A button 62 is the power determination operation, which determines the power based on the position of the cursor at the time of this operation. Then, the putt process terminates.

As described above, with the video game device and the associated video game program of an exemplary illustrative embodiment, the position of the turning point marker (i.e., the position at which the moving direction of the cursor along the power gauge is reversed) is changed depending on the situation in the golf game while the gauge length of the power gauge stays constant. The change in the position of the turning point marker is visualized in the game image, whereby the player can readily see the current situation in the golf game by visually checking the position of the turning point marker with respect to the power gauge. Specifically, a cursor position closer to the left end of the power gauge indicates more power, and the power is decreased at a predetermined rate as the cursor position moves rightward away from the left end of the power gauge. The portion of the power gauge to the left of the turning point marker is not used for setting the power. Therefore, as the position of the turning point marker changes, the player can readily see where the turning point marker is being currently positioned with respect to the left end of the power gauge. Therefore, the player can readily determine how limited the power available is under the current situation as compared with the situation where the maximum power is available, and thus how difficult it is to play the current situation. Moreover, the player can readily estimate the influence of the power limitation on the shot distance, and thus to estimate the shot distance available under the current situation. Moreover, changing the limitation on the power depending on the situation can simply be realized without changing the display of the power gauge itself.

Furthermore, changing the limitation on the power also changes the rhythm of the controller operation using the power gauge, thereby enhancing the playability of the game. The position of the turning point marker is changed according to the difficulty of the shot, and the difficulty of the controller operation increases as the position of the turning point marker shifts more to the right. Thus, the difficulty of a shot can be linked with the difficulty of the controller operation. Since various difficulty levels can be set for the controller operation so as to correspond to those in real golf, the player can enjoy a realistic golf experience with such a variety of difficulty levels.

While the cursor 244 reverses its moving direction along the power gauge 24 at the turning point marker 241 in the present exemplary illustrative embodiment, the present invention is not limited to such a cursor movement pattern. For example, the cursor 244, when it reaches the turning point marker 241, may alternatively jump back to the right end of the power gauge 24 to repeat the leftward movement. Also with such a cursor movement pattern, the rhythm of the controller operation changes as the position of the turning point marker 241 changes. With such a cursor movement pattern, the term "turning point marker" used herein may be replaced with the term "jump back point marker". As with the turning point marker, the jump back point marker can also be shifted to the right along the power gauge to increase the difficulty of the controller operation by shortening the interval at which the cursor repeatedly passes a particular point along the gauge. Moreover, while the cursor 244 reverses its moving direction at the turning point marker 241 in the present exemplary illustrative embodiment, the cursor 244 may alternatively reverse its moving direction at the power determination operation. Furthermore, the game may alternatively be played only with the power determination operation and without the impact timing determination operation. Even without the impact timing determination operation, the rhythm and difficulty of the power determination operation can be varied by varying the position of the turning point marker 241.

While the power gauge of the present exemplary illustrative embodiment is in an elongated rectangular shape that extends parallel to the long side of the game image, the shape and the orientation of the power gauge are not limited to those of the present exemplary illustrative embodiment. For example, the power gauge may alternatively extend parallel to the short side of the game image, or may alternatively be in a circular shape. Where a circular power gauge is used, the cursor may move along the circumference of the power gauge, and the angular position of the turning point marker can be shifted according to the marker position data as described above to realize effects similar to those of the exemplary illustrative embodiment described above.

While the current environmental factor is used as one of the parameters for determining the position of the turning point marker in the present exemplary illustrative embodiment, the environmental parameter may be omitted depending on the player's proficiency in the game, etc. For example, the marker position data values in the environmental factor table may be all set to "1.00", or the environmental parameter may be ignored in the final calculation of the position of turning point marker, to reduce the shift in the position of the turning point marker. While the cursor speed is varied according to the lie condition in the present exemplary illustrative embodiment, the cursor speed may alternatively be fixed to a constant speed depending on the player's proficiency in the game, etc.

While the input sections used for setting the pre-shot parameters and the in-shot parameters have been described above with specific examples, the input sections are not limited to those described above. It is understood that any type of input sections may be used as long as the various input operations are appropriately assigned to the input sections provided in the video game device for executing the video game program of the present exemplary illustrative embodiment.

While the video game program executed by the video game device of the present exemplary illustrative embodiment has been described to be a golf game, the present exemplary illustrative embodiment may be applied to other video games. Similar effects to those described above can be expected with any type of a video game in which a gauge is used to represent the power with which to move an object, such as a fishing game, a soccer game, and an object throwing game, for example.

While a home-console type video game device is used in the video game system described above, the video game device is not limited to those of a home-console type. For example, the present exemplary illustrative embodiment can be used with a portable video game device with a plurality of input sections, or a computer system having a general-purpose display section.

While a power gauge of a type where a cursor moves along the gauge has been described above, the present exemplary illustrative embodiment can be applied to a power gauge of another type where the inside of the gauge is filled gradually. In such a case, instead of moving a cursor from right to left, the power gauge is gradually filled from right to left so that the filled area gradually extends leftward. After the left end of the filled area reaches the turning point marker 241, the filled area may be gradually un-filled from left to right, or the filled area may be gradually re-filled in a different color from left to right.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A video game device for playing a golf game that proceeds in response to a player's operation, comprising:
   an input mechanism operated by the player;
   a gauge display controller for displaying, with a constant length, a gauge used for determining a power for hitting a ball;
   a cursor display controller for displaying a cursor moving along the gauge;
   a first determination mechanism for determining the power based on a position of the cursor with respect to the gauge at a time of a predetermined operation of the input mechanism;
   a shot condition setter for setting a shot condition influencing a ball travel distance determined according to the power; and
   a marker display controller for displaying a marker indicating one end of a moving range of the cursor along the gauge at a position according to the shot condition set by the shot condition setter.

2. The video game device according to claim 1, wherein when the cursor displayed by the cursor display controller reaches the marker, a moving direction of the cursor is reversed so that the cursor thereafter moves in an opposite direction along the gauge.

3. The video game device according to claim 1, wherein when the cursor displayed by the cursor display controller reaches the marker, the cursor jumps back to the other end of the moving range and repeats moving in the same direction along the gauge.

4. The video game device according to claim 2, wherein:
   the cursor display controller continues to move the cursor in the same direction along the gauge even after the power is determined by the first determination mechanism; and
   the video game device further comprises a second determination mechanism for further determining, after the power is determined by the first determination mechanism, another shot parameter based on a position of the cursor with respect to the gauge at a time of a predetermined operation of the input mechanism.

5. The video game device according to claim 1, further comprising a difficulty table storing mechanism for pre-storing, as a difficulty table, a data table defining a numerical difficulty level associated with each shot condition that can be set in the golf game so that each difficulty level reflects the difficulty in real golf under the associated shot condition,
   wherein the marker display controller retrieves, from the difficulty table, a value associated with the shot condition set by the shot condition setter, and determines the position of the marker based on the retrieved value.

6. The video game device according to claim 5, wherein the marker display controller displays the marker at a position closer to a starting position of the cursor for a difficulty level indicated by the higher retrieved value.

7. The video game device according to claim 5, wherein:
the difficulty table defines a value for each lie indicating a condition of a ground on which a ball is lying;
the shot condition setter sets at least the lie before a shot as the shot condition; and
the marker display controller retrieves, from the difficulty table, a value associated with the lie before a shot, and determines the position of the marker based on the retrieved value.

8. The video game device according to claim 7, wherein:
the difficulty table further defines a value for each combination of the lie and a club that can be selected in the golf game;
the shot condition setter sets at least a combination of the lie before a shot and a club selected for the shot as the shot condition; and
the marker display controller retrieves, from the difficulty table, a value associated with the combination of the lie before the shot and the selected club, and determines the position of the marker based on the retrieved value.

9. The video game device according to claim 5, wherein:
the difficulty table defines a value for each environmental factor of a hole played;
the shot condition setter sets at least an environmental factor of a hole currently being played as the shot condition; and
the marker display controller retrieves, from the difficulty table, a value associated with the environmental factor of the hole being played, and determines the position of the marker based on the retrieved value.

10. The video game device according to claim 5, further comprising a cursor speed calculator for calculating a speed of a cursor moving along the gauge, wherein:
the cursor speed calculator retrieves, from the difficulty table, a value associated with a shot condition set by the shot condition setter, and calculates the speed based on the retrieved value; and
the cursor display controller moves the cursor along the gauge based on the speed calculated by the cursor speed calculator.

11. The video game device according to claim 1, further comprising a character table storing mechanism for pre-storing, as a character table, a data table defining a numerical shot characteristic associated with each combination of a character that can be used in the golf game and a shot condition that can be set in the golf game,
wherein the marker display controller retrieves, from the character table, a value associated with the combination of a character making a shot and a shot condition set by the shot condition setter, and determines the position of the marker based on the retrieved value.

12. The video game device according to claim 11, wherein:
the character table defines a value for each combination of a lie indicating a condition of a ground on which a ball is lying and a character; and
the marker display controller retrieves, from the character table, a value associated with a combination of the lie before a shot and a character making the shot, and determines the position of the marker based on the retrieved value.

13. The video game device according to claim 1, wherein:
at least if a condition of a ground on which a ball is lying at a time a shot is to be taken is a rough or a bunker, the shot condition setter sets, as the shot condition, the ground condition to a rough or a bunker; and
the marker display controller displays the marker at a position closer to a starting position of the cursor if the ground condition is a rough or a bunker.

14. A video game device for playing a golf game that proceeds in response to a player's operation, comprising:
an input mechanism operated by the player;
a gauge display controller for displaying, with a constant length, a gauge used for determining a power for putting a ball;
a cursor display controller for displaying a cursor moving along the gauge;
a determination mechanism for determining the power based on a position of the cursor with respect to the gauge at a time of a predetermined operation of the input mechanism;
a putt condition setter for setting a putt condition influencing a ball travel distance determined according to the power; and
a marker display controller for displaying a marker indicating one end of a moving range of the cursor along the gauge at a position according to the putt condition set by the putt condition setter.

15. The video game device according to claim 14, wherein:
at least if a condition of a ground on which a ball is lying at a time a putt is to be taken is a green, the putt condition setter sets, as the putt condition, a speed at which the ball rolls on the green; and
the marker display controller displays the marker at a position closer to a starting position of the cursor if the speed of the ball is higher than a predetermined value.

16. A video game device for playing a golf game that proceeds in response to a player's operation, comprising:
an input mechanism operated by the player;
gauge display controller for displaying, with a constant length, a gauge used for determining a power for hitting a ball;
a filling mechanism for gradually filling an inside of the gauge in a predetermined direction;
a determination mechanism for determining the power based on a position of a front end of a filled area filled by the filling mechanism with respect to the gauge at a time of a predetermined operation of the input mechanism;
a shot condition setter for setting a shot condition influencing a ball travel distance determined according to the power; and
a turning point marker display controller for displaying a turning point marker at a position according to the shot condition set by the shot condition setter, the turning point marker indicating a position at which a direction of a filling operation by the filling mechanism is reversed,
wherein the filling mechanism reverses the direction of the filling operation when the front end of the filled area reaches the turning point marker.

17. A video game device for playing a game in which an object is moved in response to a player's operation, comprising:
an input mechanism operated by the player;
a gauge display controller for displaying, with a constant length, a gauge used for determining a power for moving the object;
a cursor display controller for displaying a cursor moving along the gauge;

a determination mechanism for determining the power based on a position of the cursor with respect to the gauge at a time of a predetermined operation of the input mechanism;

an object moving condition setter for setting an object moving condition influencing an object travel distance determined according to the power; and a marker display controller for displaying a marker indicating one end of a moving range of the cursor along the gauge at a position according to the object moving condition set by the object moving condition setter.

18. A storage medium storing a video game program to be executed by a computer for playing a golf game that proceeds in response to a player's operation, the video game program instructing the computer to perform:

a gauge display control step of displaying, with a constant length, a gauge used for determining a power for hitting a ball;

a cursor display control step of displaying a cursor moving along the gauge;

a first determination step of determining the power based on a position of the cursor with respect to the gauge at a time of a predetermined operation of an input section by the player;

a shot condition setting step of setting a shot condition influencing a ball travel distance determined according to the power; and a marker display control step of displaying a marker indicating one end of a moving range of the cursor along the gauge at a position according to the shot condition set in the shot condition setting step.

19. The storage medium storing the video game program according to claim 18, wherein when the cursor displayed in the cursor display control step reaches the marker, a moving direction of the cursor is reversed so that the cursor thereafter moves in an opposite direction along the gauge.

20. The storage medium storing the video game program according to claim 18, wherein when the cursor displayed in the cursor display control step reaches the marker, the cursor jumps back to the other end of the moving range and repeats moving in the same direction along the gauge.

21. The storage medium storing the video game program according to claim 19, wherein:

the cursor display control step continues to move the cursor in the same direction along the gauge even after the power is determined in the first determination step; and the video game program instructs the computer to perform a second determination step of further determining, after the power is determined in the first determination step, another shot parameter based on a position of the cursor with respect to the gauge at a time of a predetermined operation of the input section.

22. The storage medium storing the video game program according to claim 18, wherein:

the video game program instructs the computer to further perform a difficulty table storing step of pre-storing, as a difficulty table, a data table defining a numerical difficulty level associated with each shot condition that can be set in the golf game so that each difficulty level reflects that in real golf under the associated shot condition; and the marker display control step retrieves, from the difficulty table, a value associated with the shot condition set in the shot condition setting step, and determines the position of the marker based on the retrieved value.

23. The storage medium storing the video game program according to claim 22, wherein the marker display control step displays the marker at a position closer to a starting position of the cursor for a difficulty level indicated by the retrieved value as higher.

24. The storage medium storing the video game program according to claim 22, wherein:

the difficulty table defines a value for each lie indicating a condition of a ground on which a ball is lying;

the shot condition setting step sets at least the lie before a shot as the shot condition; and the marker display control step retrieves, from the difficulty table, a value associated with the lie before a shot, and determines the position of the marker based on the retrieved value.

25. The storage medium storing the video game program according to claim 24, wherein:

the difficulty table further defines a value for each combination of the lie and a club that can be selected in the golf game;

the shot condition setting step sets at least a combination of the lie before a shot and a club selected for the shot as the shot condition; and the marker display control step retrieves, from the difficulty table, a value associated with the combination of the lie before the shot and the selected club, and determines the position of the marker based on the retrieved value.

26. The storage medium storing the video game program according to claim 22, wherein:

the difficulty table defines a value for each environmental factor of a hole played;

the shot condition setting step sets at least an environmental factor of a hole currently being played as the shot condition; and the marker display control step retrieves, from the difficulty table, a value associated with the environmental factor of the hole being played, and determines the position of the marker based on the retrieved value.

27. The storage medium storing the video game program according to claim 22, wherein:

the video game program instructs the computer to further perform a cursor speed calculation step of calculating a speed of a cursor moving along the gauge;

the cursor speed calculation step retrieves, from the difficulty table, a value associated with a shot condition set in the shot condition setting step, and calculates the speed based on the retrieved value; and the cursor display control step moves the cursor along the gauge based on the speed calculated in the cursor speed calculation step.

28. The storage medium storing the video game program according to claim 18, wherein:

the video game program instructs the computer to further perform a character table storing step of pre-storing, as a character table, a data table defining a numerical shot characteristic associated with each combination of a character that can be used in the golf game and a shot condition that can be set in the golf game; and the marker display control step retrieves, from the character table, a value associated with the combination of a character making a shot and a shot condition set in the shot condition setting step, and determines the position of the marker based on the retrieved value.

29. The storage medium storing the video game program according to claim 28, wherein:

the character table defines a value for each combination of a lie indicating a condition of a ground on which a ball is lying and a character; and the marker display control step retrieves, from the character table, a value associated with a combination of the lie before a shot and a character making the shot, and determines the position of the marker based on the retrieved value.

30. The storage medium storing the video game program according to claim 18, wherein:

at least if a condition of a ground on which a ball is lying at a time a shot is to be taken is a rough or a bunker, the shot condition setting step sets, as the shot condition, the ground condition to a rough or a bunker; and the marker display control step displays the marker at a position closer to a starting position of the cursor if the ground condition is a rough or a bunker.

31. A storage medium storing a video game program to be executed by a computer for playing a golf game that proceeds in response to a player's operation, the video game program instructing the computer to perform:

a gauge display control step of displaying, with a constant length, a gauge used for determining a power for putting a ball;

a cursor display control step of displaying a cursor moving along the gauge;

a determination step of determining the power based on a position of the cursor with respect to the gauge at a time of a predetermined operation of an input section by the player;

a putt condition setting step of setting a putt condition influencing a ball travel distance determined according to the power; and a marker display control step of displaying a marker indicating one end of a moving range of the cursor along the gauge at a position according to the putt condition set in the putt condition setting step.

32. The storage medium storing the video game program according to claim 31, wherein:

at least if a condition of a ground on which a ball is lying at a time a putt is to be taken is a green, the putt condition setting step sets, as the putt condition, a speed at which the ball rolls on the green; and the marker display control step displays the marker at a position closer to a starting position of the cursor if the speed of the ball is higher than a predetermined value.

33. A storage medium storing a video game program to be executed by a computer for playing a golf game that proceeds in response to a player's operation, the video game program instructing the computer to perform:

a gauge display control step of displaying, with a constant length, a gauge used for determining a power for hitting a ball;

a filling step of gradually filling an inside of the gauge in a predetermined direction;

a determination step of determining the power based on a position of a front end of a filled area filled in the filling step with respect to the gauge at a time of a predetermined operation of an input section by the player;

a shot condition setting step of setting a shot condition influencing a ball travel distance determined according to the power; and a turning point marker display control step of displaying a turning point marker at a position according to the shot condition set in the shot condition setting step, the turning point marker indicating a position at which a direction of a filling operation in the filling step is reversed, wherein the filling step reverses the direction of the filling operation when the front end of the filled area reaches the turning point marker.

34. A storage medium storing a video game program to be executed by a computer for playing a game in which an object is moved in response to a player's operation, the video game program instructing the computer to perform:

a gauge display control step of displaying, with a constant length, a gauge used for determining a power for moving the object;

a cursor display control step of displaying a cursor moving along the gauge;

a determination step of determining the power based on a position of the cursor with respect to the gauge at a time of a predetermined operation of an input section by the player;

an object moving condition setting step of setting an object moving condition influencing an object travel distance determined according to the power; and a marker display control step of displaying a marker indicating one end of a moving range of the cursor along the gauge at a position according to the object moving condition set in the object moving condition setting step.

* * * * *